United States Patent
Yamada et al.

(10) Patent No.: US 7,255,729 B2
(45) Date of Patent: Aug. 14, 2007

(54) POROUS CYLINDRICAL-BODY MODULE, STRUCTURE FOR SUPPORTING POROUS CYLINDRICAL BODIES, AND METHOD FOR FASTENING A SUPPORTING MEMBER

(75) Inventors: Seiji Yamada, Nagoya (JP); Balagopal N. Nair, Nagoya (JP)

(73) Assignee: Noritake Co., Limited, Nagoya (JP)

( * ) Notice: Subject to any disclaimer, the term of this patent is extended or adjusted under 35 U.S.C. 154(b) by 458 days.

(21) Appl. No.: 10/852,211

(22) Filed: May 25, 2004

(65) Prior Publication Data
US 2005/0011358 A1    Jan. 20, 2005

(30) Foreign Application Priority Data
May 30, 2003 (JP) ............................. 2003-155748
Aug. 18, 2003 (JP) ............................. 2003-294627
Dec. 10, 2003 (JP) ............................. 2003-411780

(51) Int. Cl.
*B01D 53/22* (2006.01)
(52) U.S. Cl. .................. 96/8; 96/10; 96/11; 96/135; 96/154; 427/243; 427/245; 156/60
(58) Field of Classification Search .............. 96/4, 96/8, 10, 11, 108, 154, 135; 95/43, 45; 427/243, 427/245; 156/60
See application file for complete search history.

(56) References Cited

U.S. PATENT DOCUMENTS 2,961,062 A * 11/1960 Hunter et al. ................. 96/8
4,666,469 A * 5/1987 Krueger et al. ................ 96/8
4,808,201 A * 2/1989 Kertzman ..................... 96/10
5,332,498 A * 7/1994 Rogut ........................ 96/8
5,376,167 A * 12/1994 Broutin et al. ................ 96/8
5,470,469 A * 11/1995 Eckman ....................... 96/8

(Continued)

FOREIGN PATENT DOCUMENTS

JP    A 06-191802    7/1994

(Continued)

*Primary Examiner*—Jason M. Greene
(74) *Attorney, Agent, or Firm*—Oliff & Berridge, PLC

(57) ABSTRACT

According to the module 10, the other end 22 of each of the plurality of porous cylindrical bodies 12 the one end 20 of each of which is closed is opened to the gas chamber 58 between the end cap 18 and the end cover 54, and the end cap 18 is provided with the through-hole 53 leading from the gas chamber 56 outward, and the gas chamber 58 leads outward by means of a path passing through the through-hole 53 and through the porous cylindrical body 12. The module 10 can have a gas-passing path from the peripheral wall 24 of the porous cylindrical-body 12 outward through the gas chamber 58 and through the through-hole 53. Since the airtight sealing structure of the whole of the reaction container 60 can be formed independently of the airtight connecting structure of the through-hole 53 and the gas lead-out opening 64, the permeability and the like of the module 10 that has various dimensions can be measured by means of a common reaction container 60 formed to have a predetermined size and structure by forming the through-hole 53 in a predetermined form corresponding to the connecting structure with the gas lead-out opening 64, regardless of the size of the whole of the module 10.

24 Claims, 10 Drawing Sheets

U.S. PATENT DOCUMENTS

| | | | |
|---|---|---|---|
| 6,136,073 A * | 10/2000 | Coan et al. | 96/8 |
| 6,716,275 B1 * | 4/2004 | Reed et al. | 96/10 |
| 6,746,513 B2 * | 6/2004 | Anderson | 96/8 |
| 6,958,087 B2 * | 10/2005 | Suzuki | 96/10 |
| 2003/0047077 A1 * | 3/2003 | Giglia et al. | 96/8 |

FOREIGN PATENT DOCUMENTS

| | | |
|---|---|---|
| JP | A 07-112111 | 5/1995 |
| JP | A 07-163827 | 6/1995 |
| JP | A 08-299768 | 11/1996 |
| JP | A 2002-346332 | 12/2002 |
| JP | A 2002-355523 | 12/2002 |
| JP | A 2003-144861 | 5/2003 |
| JP | A 2003-210951 | 7/2003 |

* cited by examiner

POROUS CYLINDRICAL-BODY MODULE, STRUCTURE FOR SUPPORTING POROUS CYLINDRICAL BODIES, AND METHOD FOR FASTENING A SUPPORTING MEMBER

This application is based on Japanese Patent Application Nos. 2003-155748, 2003-294627 and 2003-411780 filed May 30, 2003, Aug. 18, 2003, Dec. 10, 2003, respectively, the contents of which are incorporated hereinto by reference.

BACKGROUND OF THE INVENTION

1. Field of the Invention

The present invention relates to a porous cylindrical-body module in which a plurality of porous cylindrical bodies are bundled together, a structure for supporting the porous cylindrical bodies each of which has a porous membrane on its outer circumferential surface, and a method for fastening a supporting member.

2. Description of the Related Art

For example, there is known a gas separator that includes a porous cylindrical body having a porous peripheral wall, which can be selectively permeated by a specific gas, in an airtight container. A hydrogen gas separator disclosed in, for example, JP-A H7-112111 and JP-A H6-191802 can be mentioned as such a gas separator. The aforementioned porous peripheral wall has, for example, multiple minute openings, i.e., multiple gas-permeable pores that can be permeated by the aforementioned specific gas. This porous cylindrical body is a hollow cylinder made of ceramic porous material such as alumina ($Al_2O_3$) or is a body having a porous membrane made of alumina or the like on the outer circumferential surface of the body. The specific gas is separated such that, for example, a raw gas containing the specific gas is supplied into the airtight container, and then the specific gas that has permeated the peripheral wall of the porous cylindrical body from its outer part to its inner part is taken out from an open end provided at its end and is recovered.

In the thus structured gas separator, generally, the porous cylindrical bodies are used in the form of a module in which the cylindrical bodies are bundled together in a state of being kept apart from each other in a radial direction, in order to obtain a great gas flow rate in as small a volume as possible.

FIG. 18 is a sectional view of the structure of a porous cylindrical-body module 200 housed in a high-pressure container 202 of a hydrogen gas separator, which is disclosed in JP-A H7-112111 mentioned above. In FIG. 18, the porous cylindrical-body module 200 has a structure in which an end of each of a plurality of porous cylindrical bodies 208 is airtightly fastened to, for example, a disk-shaped sealing body 206 that has closed-end holes 204 and in which the other end thereof is caused to pass through a through-hole 212 of a disk-shaped supporting body 210 and is fastened thereto. The sealing body 206 and the supporting body 210 are both made of dense alumina ceramics or the like, and the supporting body 210 is airtightly sandwiched between a pair of flanges 214 and 216 of the high-pressure container 202. Therefore, since a closed space, in which a gas that has flowed in from a gas inlet 220 cannot flow out except for a path that passes through the porous cylindrical body 208, is formed between a main body 218 of the high-pressure container 202 and the supporting body 210, the gas that has permeated the peripheral wall of the porous cylindrical body 208 inward is discharged from an open end 222.

Additionally, in the gas separator, for example, in order to fasten the porous cylindrical body to the inside of the airtight container, a supporting member made of a dense material is airtightly fastened to both ends of the gas-separating cylindrical body, i.e., to both ends of the porous cylindrical body, as disclosed in JP-A H7-163827, JP-A H8-299168, and JP-A H7-112111 mentioned above. Additionally, for example, when a plurality of porous cylindrical bodies are used in the form of a module in which the porous cylindrical bodies are bundled together in a state of being kept apart from each other in a radial direction, the aforementioned supporting member has a function to open one end of each cylindrical body toward the inside of a shared airtight chamber and to close the other end thereof.

Additionally, in a structure having a porous membrane on a porous cylindrical body, the porous membrane used herein is smaller in pore diameter than the porous cylindrical body, and, if the outer circumferential surface of the porous cylindrical body is exposed, a gas that is to be separated will pass through the exposed surface of the porous cylindrical body, and therefore desired separation efficiency cannot be obtained. Therefore, parts other than a part of the outer circumferential surface of the porous cylindrical body where the supporting member is airtightly fastened must be covered with the porous membrane.

In order to obtain this fastened state of the supporting member and the formed state of the porous membrane, for example, the hydrogen gas separator disclosed in JP-A H7-112111 mentioned above employs a supporting structure (or a fastening structure) shown in FIG. 19. This supporting structure is formed by fastening a porous cylindrical body 224 to a supporting member 226 by use of a sealing material such as frit glass and then forming a porous membrane 230 on the outer circumferential surface of the cylindrical body that has been exposed from a seal portion 22B. At this time, in order to prevent a gap from being generated between the seal portion 226 and the porous membrane 230 so as to expose the outer circumferential surface of the porous cylindrical body 224, the porous membrane 230 is formed to further cover the inner peripheral part of the supporting member 226 so as to be slightly overlapped with the seal portion 228 in an example shown in the figure.

Additionally, for example, a hydrogen gas separator disclosed in JP-A H8-299768 mentioned above employs a supporting structure shown in FIG. 20. This supporting structure is formed by providing a porous membrane 230 on the entire outer circumferential surface except both ends of a porous cylindrical body 224 and then fastening the porous membrane 230 to a supporting member 226 by use of a sealing material. At this time, in order to prevent a gap from being generated between a seal portion 228 and the porous membrane 230, the seal portion 228 is provided so as to be slightly overlapped with the porous membrane 230.

Additionally, although the yield of a gas in the porous cylindrical-body module can be raised by increasing the supply pressure of a raw gas that is supplied, for example, into an airtight container, the upper limit of the supply pressure is relatively low because the aforementioned porous material is low in strength. Therefore, as is disclosed in, for example, JP-A 2003-210951, JP-A 2002-346332, JP-A 2002-355523, and JP-A 2003-144861, the yield is raised by causing a sweep gas to flow from the other open end of the porous cylindrical body toward the aforementioned one open end.

Moreover, as a method for measuring the permeability (e.g., permeation flow rate) of the porous cylindrical-body module 200 shown in FIG. 18, there are two possible methods, i.e., a method for evaluating the characteristics of the porous cylindrical bodies 208 one by one prior to the assembly of the cylindrical bodies 208 into a module and a method for evaluating the whole of a porous cylindrical-body module 200 formed by assembling the cylindrical bodies together. According to the former method, an individual measuring operation can be easily performed, but a large amount of labor and much time are required to produce multiple porous cylindrical-body modules 200, and, disadvantageously, the airtightness and thermal shock resistance of a seal portion must be again ascertained after being modularized. Since it is difficult to stably produce porous cylindrical bodies having constant permeability, the characteristics of the whole of a module cannot be ensured by a representative value obtained by measuring a part of the cylindrical bodies.

In contrast, according to the latter method, even when multiple porous cylindrical-body modules 200 are produced, the number of measurement times can be set to be relatively small, and the airtightness and thermal shock resistance thereof can be simultaneously evaluated. However, a supporting portion 108 is produced to have a size and shape according to each of many variously sized and shaped high-pressure containers 202 so as to be airtightly sandwiched between flanges 214 and 216 of the high-pressure container 202. Therefore, disadvantageously, a measuring container that has a sealing structure according to each module is needed when the permeability and the like of the porous cylindrical-body module 200 are measured.

Additionally, the supporting structure of FIG. 19 disclosed in JP-AH7-112111 mentioned above is disadvantageously characterized in that the porous membrane 230 is broken at the boundary between the porous membrane 230 and the seal portion 228 resulting from a difference in the thermal expansion coefficient between the porous membrane 230 and the seal portion 228 after the membrane is formed and in that a seal defect by which the outer circumferential surface of the porous cylindrical body 224 is exposed is liable to occur. The porous membrane 230 is easily broken because the membrane has a small thickness of, for example, about 1 to 100 (μm). Additionally, the supporting structure of FIG. 20 disclosed in JP-A H8-299768 mentioned above is required to set its firing temperature to be lower than a temperature that is reached when the porous membrane 230 is formed, because the seal portion 228 is formed after the membrane is formed. Therefore, disadvantageously, bonding strength cannot be secured resulting from the lowness of the firing temperature. Although JP-A H7-163827 and JP-A H8-299768 describe an aspect in which the firing temperature that is reached when the supporting member 226 is fastened is set to be higher than the temperature reached when the porous membrane 230 is formed, this manufacturing condition allows the porous membrane 230 to deteriorate and be easily broken during manufacture or during use. Additionally, although JP-A H7-163827 describes a structure in which the porous membrane 230 is formed on the whole of the outer circumferential surface of the porous cylindrical body 224, sufficient bonding strength cannot be obtained because the porous cylindrical body 224 is joined through the porous membrane 230 in the thus formed structure. Without being limited to the use application of a gas separation, this problem will likewise arise in various use applications such as liquid filtration when the porous cylindrical body 224 having the porous membrane 230 is structured to be supported by the supporting member 226.

Additionally, as described in JP-A2003-210951 mentioned above, the conventional porous cylindrical-body module that can supply a sweep gas has a structure in which the sweep gas is sent from the side of one end of the porous cylindrical body in the airtight container, and a separated gas and the sweep gas are recovered from the side of the other end thereof. Therefore, disadvantageously, a space where the airtight container is disposed becomes large in the porous cylindrical-body module that can supply a sweep gas, because an opening used to introduce the sweep gas and an opening used to recover the other gases are provided at positions opposite to each other in the airtight container.

SUMMARY OF THE INVENTION

The present invention was made in consideration of the foregoing circumstances. A first object of the present invention is to provide a porous cylindrical-body module in which permeability and the like can be measured in a common measuring container adaptable to various dimensions. A second object thereof is to provide a supporting structure in which a supporting member can be joined closely and with great strength to a porous cylindrical body having a porous membrane, and is to provide a method for fastening the supporting member. A third object thereof is to provide a porous cylindrical-body module that can keep a space to dispose an airtight container small although a sweep gas can be supplied.

A porous cylindrical-body module of a first aspect of the invention to achieve the first object is essentially characterized by including (a) a plurality of porous cylindrical bodies that are bundled together apart from each other with a predetermined distance, each of which has a porous peripheral wall that is permeable to a predetermined gas, each of which is cylindrically shaped, and one end of each of which is substantially closed, and (b) a hollow sealing body that includes a gas chamber enclosed by a dense wall that is impermeable to the predetermined gas and gas passages leading from the interior of the gas chamber outward and in which the gas chamber is linked outside through a path that follows the gas passages and through a path that passes through the porous cylindrical bodies by airtightly fastening the other end of each of the porous cylindrical bodies in a state in which the other end thereof is opened to the interior of the gas chamber.

Accordingly, since an end of each of the plurality of porous cylindrical bodies, the other end of each of which is closed, is opened to the interior of the gas chamber provided in the hollow sealing body, and the hollow sealing body is provided with the gas passage leading from the interior of the gas chamber outward, and the gas chamber is communicated with the outside through the path following the gas passage and through the path passing through the porous cylindrical bodies, i.e., since the other parts are airtightly structured, a gas-passing path that leads from the peripheral wall of the porous cylindrical body outward through the gas chamber and through the gas passage is formed in the porous cylindrical-body module. Therefore, since a gas that has permeated the peripheral wall of the porous cylindrical body from outside the peripheral wall thereinto is caused to flow out through the gas passage, all that is needed to measure the permeability or the like of the porous cylindrical-body module is, for example, to house the porous cylindrical-body module in the measuring container that has a gas inlet and a gas recovering opening, to airtightly connect the gas passage to the gas recovering opening, and to airtightly seal the measuring container. Therefore, since an airtight sealing structure of the whole of the measuring container can be formed independently of an airtight connecting structure of the gas passage and the gas recovering opening, the permeability or the like of variously-sized porous cylindrical-body modules can be measured by the use of a common measuring container that has fixed dimensions and a fixed structure by providing the gas passage in a given form according to the connecting structure to the gas recovering opening without any relation to the size of the entire porous cylindrical-body module. Therefore, it is possible to obtain a porous cylindrical-body module that can measure permeability or the like by means of a common measuring container adaptable to variously-sized porous cylindrical-body modules.

Moreover, since the porous cylindrical-body module is structured as above, when this is incorporated into a gas separator or the like, the airtight sealing structure of the entire container can be formed independently of the airtight connecting structure for a connection between the gas passage and the gas recovering opening in the same way as the cylindrical-body module is disposed in the measuring container. Therefore, advantageously, the structure of the apparatus and assembling operations are simplified.

In a preferred form of the porous cylindrical-body module according to the first aspect of the invention, the porous cylindrical-body module includes a dense cylindrical body, which has a dense peripheral wall impermeable to the aforementioned gas, and one end of which is opened to the interior of the gas chamber whereas the other end of which is opened outside the hollow sealing body by being airtightly fastened to the gas passage. Accordingly, since the dense cylindrical body is airtightly connected to the gas passage, the other end of the dense cylindrical body that is opened outside the hollow sealing body is airtightly connected to, for example, the gas recovering opening of the measuring container, and the gas passage and the gas recovering opening can be airtightly connected to each other. Therefore, advantageously, connecting operations can be more easily performed, and, consequently, airtightness can be more easily secured than a case in which the gas passage provided in the hollow sealing body is connected directly to the gas recovering opening. In other words, advantageously, a connection can be easily formed to the gas recovering opening or the like of the apparatus into which the measuring device and the porous cylindrical-body module are incorporated, and, consequently, handling can be even more easily performed if the dense cylindrical body is provided, although the porous cylindrical-body module can be formed only of the porous cylindrical body and the hollow sealing body.

In a preferred form of the porous cylindrical-body module according to the first aspect of the invention, the porous cylindrical-body module includes a closing-and-sealing body that is formed of a dense material impermeable to the predetermined gas and that is airtightly fastened to the plurality of porous cylindrical bodies in a state in which its one end is closed. As a result, advantageously, the porous cylindrical body can be more easily produced, and the closed structure can be more easily formed than a case in which the porous cylindrical body is constructed in a shape in which one end thereof is originally closed or a case in which an end of each of the porous cylindrical bodies is individually closed, and, since the porous cylindrical body is united by the closing-and-sealing body also on the side of its end, the mechanical strength of the whole of the porous cylindrical-body module can be increased.

In a preferred form of the porous cylindrical-body module according to the first aspect of the invention, the dense cylindrical body has a structure in which one end thereof is opened to the interior of the gas chamber, and the other end thereof is opened to the opposite side of the hollow sealing body by allowing the other end to penetrate through the closing-and-sealing body and to protrude by a predetermined length. Accordingly, since the dense cylindrical body, which is superior in mechanical strength to the porous cylindrical body resulting from being dense, is disposed between the hollow sealing body and the closing-and-sealing body, the mechanical strength becomes greater than a case in which the dense cylindrical body is connected only to the hollow sealing body.

In a preferred form of the porous cylindrical-body module according to the first aspect of the invention, the porous cylindrical body is satisfied by substantially closing its one end. For example, one end of the porous cylindrical body may be completely closed with a closing member made of a material denser than that of the porous cylindrical body, or the porous cylindrical body,may be constructed in closed-end form, and, by opening one end of the porous cylindrical body to the common container, the structure may be formed so that a gas that has flowed into the plurality of porous cylindrical bodies can circulate in each cylindrical body on the side of that end. The term "substantially closing" mentioned above includes an aspect such as a case in which almost the same denseness as that of the peripheral wall of the porous cylindrical body is provided.

A porous cylindrical-body supporting structure of a second aspect of the invention to achieve the second object has a structure in which a predetermined supporting member with which an outer circumferential surface of a porous cylindrical body is annularly covered is fastened to a part in a longitudinal direction of the porous cylindrical body having many gas-permeable pores that lead from the exterior to the interior of its peripheral wall, and the porous-cylindrical-body supporting structure is essentially characterized by including (a) a first seal portion made of a first sealing material with which the porous cylindrical body and the supporting member are fastened together so as to tightly seal a gap therebetween, (b) a porous membrane that is provided to annularly cover the outer circumferential surface of the porous cylindrical body and through which the gas-permeable pore is led outward, and (c) a second seal portion made of a second sealing material that is annularly provided at a boundary between the porous membrane and the first seal portion so as to close the outer circumferential surface of the porous cylindrical body and that has a lower softening point than a temperature at which the porous membrane is formed.

A method for fastening a supporting member of a third aspect of the invention to achieve the second object, with which an outer circumferential surface of a porous cylindrical body is annularly covered, to a part in a longitudinal direction of the porous cylindrical body hating many gas-permeable pores that lead from the exterior to the interior of a peripheral wall of the porous cylindrical body, and the method is essentially characterized by comprising (a) a first sealing step to fasten the supporting member to the outer circumferential surface of the porous cylindrical body with a first sealing material and thereby tightly sealing a gap therebetween with a first seal portion made of the first sealing material, (b) a membrane forming step to cover the outer circumferential surface of the porous cylindrical body, to which the supporting member has been fastened, with a porous membrane through which the gas-permeable pore is led outward, and (c) a second sealing step to seal a boundary between the porous membrane and the first seal portion with a second sealing material having a lower softening point than a temperature at which the porous membrane is formed and thereby close the outer circumferential surface of the porous cylindrical body with an annular second seal portion made of the second sealing material on the boundary.

Accordingly, the supporting member and the porous cylindrical body are fastened together with the first seal portion, and a gap therebetween is tightly sealed with the first seal portion, while the outer circumferential surface of the porous cylindrical body is sealed with the annular second seal portion provided at the boundary between the first seal portion and the porous membrane. Since the fastening strength by which the supporting member and the porous cylindrical body are fastened together is secured by the first seal portion, the second seal portion with which the boundary between the porous membrane and the first seal portion is annularly covered is not required to contribute to the fastening of the supporting member and the porous cylindrical body to each other. Therefore, since the second seal portion is formed by use of the second sealing material that can be burned at a temperature lower than a membrane forming temperature after the porous membrane has been formed, airtightness can be secured without deteriorating the porous membrane. In other words, since fastening and sealing functions to fasten and seal the supporting member and a sealing function to seal the boundary are shared between the first seal portion and the second seal portion, these can coexist. Therefore, it is possible to obtain a supporting structure in which the supporting member can be joined tightly and with high intensity to the porous cylindrical body provided with the porous membrane and in which the outer circumferential surface of the porous cylindrical body is sealed up.

It is to be noted that, in the second and third aspect of the inventions, the "boundary between the porous membrane and the first seal portion" may be a boundary where the first seal portion and the porous membrane are kept apart from each other, or may be a boundary where the first seal portion and the porous membrane are connected together, or may be a boundary where the first seal portion and the porous membrane are overlapped with each other. If they are overlapped with each other, the whole of an overlapped area is the "boundary." The term "tightly" and the term "sealed" denote the existence of denseness, such as airtightness or fluid-tightness, corresponding to the purpose of use of the porous cylindrical body. Additionally, the term "annularly" denotes continuity in a circumferential direction on the outer circumferential surface of the porous cylindrical body and is not limited to the meaning of "circularly."

In a preferred form of the second and third aspect of the inventions, the porous membrane and the first seal portion are kept apart from each other by a predetermined distance in the longitudinal direction of the porous cylindrical body. That is, the porous membrane is formed apart from the first seal portion by a predetermined distance in the longitudinal direction of the porous cylindrical body. Accordingly, since the porous membrane and the first seal portion are not in contact with each other, stress resulting from, for example, a difference in the thermal expansion coefficient therebetween is prevented from acting on the porous membrane, and, consequently, the porous membrane is further controlled so as not to be broken.

The predetermined distance, i.e., a gap magnitude is preferably 10 (μm) or more and is preferably below 1 (cm). More preferably, it is 1 (mm) or more and is preferably below 5 (mm). If it is small, the second sealing material cannot easily enter the gap, and therefore the fastening strength of the second seal portion will become lower than a case in which the sealing material is in contact with the outer circumferential surface of the porous cylindrical body. In contrast, if it is large, the area of the porous membrane will disadvantageously become small by a space corresponding to the magnitude of the gap.

In a preferred form of the second and third aspect of the inventions, an end of the first seal portion on the side of the porous membrane is projected from the supporting member, and the second seal portion is fastened to the first seal portion and to the supporting member. Accordingly, since the second seal portion is fastened to both the first seal portion and the supporting member, fastening strength by which the porous cylindrical body and the supporting member are fastened together or sealability at the boundary becomes higher than a case in which the second seal portion is fastened to only one of the first seal portion and the supporting member.

In a preferred form of the second and third aspect of the inventions, the supporting member supports a plurality of the porous cylindrical bodies. For example, for use in gas separation or liquid filtration, a plurality of porous cylindrical bodies are used in a gathered form (i.e., in a bundled form) in order to obtain high separation efficiency or high filtration efficiency in as small a volume as possible. The supporting structure of the present invention and a fastening method for fastening the supporting member are applicable also to this use.

In a preferred form of the second and third aspect of the inventions, the supporting member is fastened to an open end of the porous cylindrical body, and the open end thereof is opened to the interior of an airtight chamber at least at a part of an outer wall of which is formed of the supporting member. That is, it is permissible that the supporting member not only supports the porous cylindrical body but also constitutes the outer wall of the airtight chamber to which the open end of the porous cylindrical body is opened. For example, when a plurality of porous cylindrical bodies are bundled together, the structure can be formed so that one end of each of the porous cylindrical bodies is closed whereas the other end thereof is opened to the interior of a common airtight chamber and so that a gas or a liquid that has entered the interior of the porous cylindrical body through the peripheral wall of the porous cylindrical body is recovered through an opening formed in the airtight chamber.

In a preferred form of the second and third aspect of the inventions, the first sealing material and the second sealing material are both made of glass paste. More preferably, the first sealing material is silica ($SiO_2$)-alumina-calcia (CaO)-based glass, and the second sealing material is silica-based glass, silica-alumina-based glass, or silica-alumina-boron oxide ($B_2O_3$)-based glass, and the porous membrane is made of silica or alumina.

In a preferred form of the second and third aspect of the inventions, concerning the first sealing material, a joining temperature, at which the porous cylindrical body and the supporting member are joined together, i.e., a forming temperature, at which the first seal portion is formed, is, for example, in the range of 700 to 1200 (° C.), preferably, about 950 (° C.). Concerning the second sealing material, a firing temperature for sealing, i.e., a forming temperature, at which the second seal portion is formed, is, for example, in the range of 200 to 700 (° C.), preferably, about 620 (° C.). Concerning the porous membrane, a membrane forming temperature is, for example, in the range of 500 to 900 (° C.), preferably, about 650 (° C.). Although these temperatures are appropriately changed depending on materials determined in accordance with the purpose of use, it is preferable to set their forming temperatures to be lowered in order of the first seal portion, the porous membrane, and the second seal portion as mentioned above.

In a preferred form of the second and third aspect of the inventions, the supporting structure and the fastening method are suitably applicable, for example, to a porous cylindrical-body module as described in the first invention used for gas separation, they are likewise applicable to a structure for supporting porous cylindrical bodies used for other various use applications such as liquid filtration if the structure is formed such that a porous membrane is provided on the outer circumferential surface of each of the porous cylindrical bodies and such that the porous cylindrical bodies are supported by a proper supporting body. That is, as in the first invention, the second and third inventions are applicable to a case in which a dense cylindrical body is used together.

Additionally, in a preferred form of the second and third aspect of the inventions, the second and third inventions are suitably applicable to a structure for supporting porous cylindrical bodies in which a fluid is caused to flow through their peripheral walls and through a predetermined position (e.g., open end) in the longitudinal direction. In other words, in these porous cylindrical bodies, the second and third inventions are suitable when a supporting body to be incorporated into and held by an apparatus is fastened and when a fastened part is required to have sealability and fastening strength. Although the aforementioned predetermined position in the longitudinal direction is, for example, one end or both end faces of the cylindrical body, the cylindrical body may lack a part of its peripheral wall.

Although the supporting member to support the porous cylindrical body is disposed, for example, at both ends of the porous cylindrical body in a preferred form of the second and third inventions, these inventions are likewise applicable when the porous cylindrical body is supported by an intermediate portion in the longitudinal direction.

A porous cylindrical-body module of a fourth aspect of the invention to achieve the third object is essentially characterized by including (a) a plurality of porous cylindrical bodies each of which has a porous peripheral wall permeable to a predetermined gas, both ends of each of which are opened, each of which is cylindrically shaped, and which are bundled together so as to be kept apart from each other with a predetermined distance; (b) a dense cylindrical body which has a dense peripheral wall impermeable to the predetermined gas, both ends of which are opened, which is cylindrically shaped, and which is bundled together with the plurality of porous cylindrical bodies so as to be kept apart from the plurality of porous cylindrical bodies with a predetermined distance; (c) a connection path used to guide the gas that has been discharged from ends of the plurality of porous cylindrical bodies, which are located on the same side in the longitudinal direction of the porous cylindrical body, into the interior of the dense cylindrical body from an end of the dense cylindrical body, which is located on the same side as the ends of the plurality of porous cylindrical bodies; and (d) a sweep-gas supplying portion which is used to send a sweep gas from the other end of each of the plurality of porous cylindrical bodies and which is provided on the side of the other end of each of the plurality of porous cylindrical bodies.

Accordingly, since the dense cylindrical body and the plurality of porous cylindrical bodies are bundled together and since the ends of these are connected together by means of the connection path, a porous cylindrical-body module in which the dense cylindrical body and the plurality of porous cylindrical bodies are bundled together can have a passage of a gas moving back and forth in such a way as to flow from the other end of the porous cylindrical body to the one end thereof in the interior of the porous cylindrical body and flow from the one end of the dense cylindrical body to the other end thereof in the interior of the dense cylindrical body. Therefore, a gas that has permeated the peripheral wall of the porous cylindrical body and has entered the interior thereof flows through the interior thereof and is discharged from the one end thereof to the connection path, is then caused to flow into the dense cylindrical body from the one end of the dense cylindrical body through the connection path, is then caused to flow through the interior of the dense cylindrical body, and is recovered from the other end of the dense cylindrical body. Moreover, since the sweep-gas supplying portion is provided to send a sweep gas from the other end of the porous cylindrical body, the permeability of the predetermined gas that permeates the peripheral wall can be heightened by passing the sweep gas, and, consequently, the yield can be improved, without raising the supply pressure of a raw gas. At this time, since the sweep-gas supplying portion is disposed on the side of the other end of the porous cylindrical body, the supply of the sweep gas and the recovering of a separated gas are performed on the side of the same end in the longitudinal direction of the porous cylindrical body. Therefore, unlike a case in which these operations are respectively performed on opposite sides, an installation space of the airtight container does not become large by providing the sweep-gas supplying portion, and therefore it is possible to obtain a porous cylindrical-body module in which the installation space of the airtight container can be kept small while being able to supply the sweep gas.

In a preferred form of the fourth aspect of the invention, the porous cylindrical-body module includes a gas chamber enclosed by a dense wall impermeable to the predetermined gas and a hollow sealing body that is airtightly fastened to the plurality of porous cylindrical bodies and to the dense cylindrical body so that one end of each of the plurality of porous cylindrical bodies and one end of the dense cylindrical body are opened to the gas chamber, and the connection path is formed by the gas chamber. Accordingly, the plurality of porous cylindrical bodies and the dense cylindrical body are bundled together by the hollow sealing body at the one end, and the one end is opened to the interior of the gas chamber provided inside it, and hence the gas chamber is allowed to function as the connection path. Therefore, advantageously, the structure can be made simpler, and production operations can be more easily performed than a case in which these are assigned as different members, because the connection path is formed simultaneously when the plurality of porous cylindrical bodies and the dense cylindrical body are bundled together.

In a preferred form of the fourth aspect of the invention, the porous cylindrical-body module includes a supporting body that is made of a dense material impermeable to the predetermined gas and that is airtightly fastened by allowing the other end of each of the plurality of porous cylindrical bodies and the other end of the dense cylindrical body to pass through the supporting body from one surface of the supporting body to the other surface thereof, and the sweep-gas supplying portion is provided on the other surface of the supporting body. Accordingly, advantageously, handling operations are facilitated because the plurality of porous cylindrical bodies and the dense cylindrical body are fastened to the supporting body so as to be bundled together at those other ends. When the porous cylindrical-body module is used while being disposed in the airtight container or the like, it is recommended to connect the sweep-gas supplying portion provided on the other surface of the supporting body to a sweep gas supplying path of the airtight container and connect the other end of the dense cylindrical body to a gas recovering path of the airtight container. Preferably, the dense cylindrical body is, for example, in a state of being projected longer on the side of the other end than the porous cylindrical body, but, without being limited to such a positional relationship, what is at least required is to allow the other end to be independently connectable to the gas recovering path.

In a preferred form of the fourth aspect of the invention, in which the supporting body is fastened to the other end of the porous cylindrical body and to the other end of the dense cylindrical body, there is provided a lid member, the lid member being made of a dense material impermeable to the predetermined gas, the lid member being airtightly fastened to the supporting body so as to form a gas chamber between the other surface of the supporting body and the lid member, and the lid member having a through-hole that functions as the sweep-gas supplying portion by leading the gas chamber outward, and the other end of each of the plurality of porous cylindrical bodies is opened to the interior of the gas chamber, and the other end of the dense cylindrical body is caused to pass through the lid member and is opened outside the gas chamber. Accordingly, a hollow sealing body, which contains a gas chamber enclosed with a dense wall by means of the supporting body and the lid member, is formed, and the lid member is provided with the through-hole functioning as the sweep-gas supplying portion, and the other end of each of the plurality of porous cylindrical bodies is opened to the interior of the gas chamber so as to be connected to the through-hole, i.e., to the sweep-gas supplying portion via the gas chamber whereas the other end of the dense cylindrical body is caused to pass through the lid member and is opened outside the gas chamber independently of the porous cylindrical body. In other words, the plurality of porous cylindrical bodies and the dense cylindrical body are bundled together at those other ends, and the sweep-gas supplying portion is provided, and the other end of the dense cylindrical body is opened outside the gas chamber. Therefore, since it is possible to form a structure in which the sweep gas is supplied only to the plurality of porous cylindrical bodies simultaneously when the plurality of porous cylindrical bodies and the dense cylindrical body are bundled together and in which a gas is recovered from the dense cylindrical body, the structure can be made simpler, and production operations can be more easily performed than a case in which these are assigned as different members. Moreover, advantageously, all that is needed is to airtightly connect the sweep-gas supplying portion to the sweep gas supplying path and to airtightly connect the other end of the dense cylindrical body to the gas recovering path, and therefore there is no need to provide another airtight sealing structure.

The number of through-holes to be provided above may be one or may be two or more. Additionally, the through-hole may be provided in a tubular member protruding from the lid member so as to be extended toward the other side of the other end of the porous cylindrical body. If constructed in this way, the other end of the porous cylindrical body can be easily connected to the sweep gas supplying path by connecting the sweep gas supplying path to this tubular member.

In a preferred form of the fourth aspect of the invention, in which the supporting body is fastened to the other end of the porous cylindrical body and to the other end of the dense cylindrical body, there is provided a lid member which is made of a porous material permeable to the sweep gas, which is fastened to the other surface of the supporting body while closing an opening of the other end of each of the plurality of porous cylindrical bodies, and through which the other end of the dense cylindrical body is caused to pass. Accordingly, since the other end of the porous cylindrical body is closed with the porous lid member, a gas that has entered the interior of the porous cylindrical body through the peripheral wall thereof is prevented from flowing backward toward the other end thereof in comparison with a case in which this is completely exposed. According to this structure, the lid member is substantially provided with innumerable through-holes through which the sweep gas passes, and therefore the sweep-gas supplying portion can be connected to the sweep gas supplying path by airtightly covering the lid member with a suitable member such as a constituent member of the airtight container. The term "closing an opening of the other end" mentioned above is not limited to a state in which the other end surface of the porous cylindrical body is closed by disposing the lid member in contact with the other surface of the supporting body. It is permissible to reach a state in which this is closed apart from the other end surface thereof by being placed apart from the other surface of the supporting body, i.e., a state in which a gap is formed therebetween.

In the aforementioned aspect, for example, the supporting body is formed with sufficiently large total dimensions with respect to the total distribution area in a plane perpendicular to the longitudinal direction of the plurality of porous cylindrical bodies and to the longitudinal direction of the dense cylindrical body, while the sweep gas supplying path and the gas recovering path are formed in the airtight container, and the rim of the supporting body is airtightly attached to the end surface of the lid member that is a constituent element of the airtight container, and the other end of the dense cylindrical body is airtightly connected to the gas recovering path so as to airtightly contain the side of the one end of the porous cylindrical body in the airtight container.

In a preferred form of the fourth aspect of the invention, the porous cylindrical-body module has a structure in which the hollow sealing body is fastened to the one end of each of the plurality of porous cylindrical bodies and to the one end of the dense cylindrical body and in which the supporting body is fastened to the other end of each cylindrical body. Accordingly, the plurality of porous cylindrical bodies and the dense cylindrical body are bundled together by fastening the hollow sealing body and the supporting body to both ends of each cylindrical body, and the one end of each cylindrical body is opened to the interior of the gas chamber that functions as a connection path. Therefore, simultaneously when they are bundled together, a gas passage is formed which leads from the other end of the porous cylindrical body to the other end of the dense cylindrical body through the one end of the porous cylindrical body, through the connection path, and through the one end of the dense cylindrical body, and the one end of each of the plurality of porous cylindrical bodies is closed with the hollow sealing body. Therefore, merely by disposing the porous cylindrical-body module in the airtight container and by connecting the sweep gas supplying path and the gas recovering path that are provided in the airtight container to the sweep-gas supplying portion and to the other end of the dense cylindrical body, it is possible to obtain a filter structure in which the specific gas can flow through the gas passage only through the path passing through the peripheral wall of the porous cylindrical body, without forming another structure, especially without a sealing structure. As a result, advantageously, since the airtight sealing structure of the whole of the airtight container can be formed independently of the airtight structure of the porous cylindrical-body module, there is no need to change the sealing structure of the airtight container in accordance with the dimensions of the porous cylindrical-body module, and assembling operations to the interior of the airtight container can be easily performed.

In the aforementioned structure, in a case in which one surface of the supporting body is covered with the dense lid member having the through-hole so as to form a gas chamber therebetween, the other end of each of the plurality of porous cylindrical bodies is further opened to the interior of the gas chamber simultaneously when bundled together. Therefore, since the other end of each of the plurality of porous cylindrical bodies is closed with the supporting body and with the lid member and is connected to the common through-hole, the sweep-gas supplying portion can be even more easily connected to the sweep gas supplying path when disposed in the airtight container.

Additionally, if the porous cylindrical body is not required to be airtightly sealed with a glass sealing material or the like when the sealing structure of the porous cylindrical-body module is made up of a hollow sealing body, a supporting body, and a lid member and is disposed in the airtight container as described above, a porous membrane can be formed after joining the hollow sealing body, the supporting body, and the lid member together in a case in which the porous membrane having a predetermined pore diameter that substantially functions as a filter is disposed on the outer circumferential surface of the porous cylindrical body. Therefore, advantageously, joining strength therefore can be easily secured.

In this way, in a structure to be airtightly sealed with, for example, a flange portion when the porous cylindrical body is disposed in the airtight container, a sealing process is performed after a porous membrane is formed. Therefore, a firing temperature for sealing it must be made lower than a membrane forming temperature so that a formed porous membrane does not change in quality as described above. For this reason, a conventional defect resides in that the joining strength cannot be easily secured resulting from a low firing temperature.

In a preferred form of the first to fourth aspect of the inventions, the plurality of porous cylindrical bodies (the porous cylindrical bodies and the dense cylindrical body in an aspect in which the dense cylindrical body is provided) have those one ends located in one plane. Accordingly, advantageously, fastening operations can be easily performed when fastened with a hollow sealing body or a supporting member. Another advantage is that, in an aspect in which the hollow sealing body is fastened, the size of a gas chamber formed thereby can be made small.

In a preferred form of the first to fourth aspect of the inventions, in an aspect in which the dense cylindrical body is provided, the dense cylindrical body has its other end protruding longer than the other ends of the plurality of porous cylindrical bodies. Accordingly, advantageously, connecting operations can be easily performed when the dense cylindrical body is connected to a recovering path used to recover a fluid (for example, gas), which has flowed into the porous cylindrical body and has flowed through the dense cylindrical body, from the other end of the dense cylindrical body independently of the porous cylindrical body, because the other end thereof protrudes longer than that of the porous cylindrical body. More preferably, the plurality of porous cylindrical bodies have those other ends located in one plane, and the dense cylindrical body has its other end protruding from the one plane. Accordingly, advantageously, the other ends of the plurality of porous cylindrical bodies can be easily contained in a gas chamber or the like.

In a preferred form of the first to fourth aspect of the inventions, in an aspect in which the dense cylindrical body is provided, in a distribution area of the whole of the plurality of porous cylindrical bodies and the entire dense cylindrical body in a plane perpendicular to the longitudinal direction of the dense cylindrical body, the dense cylindrical body is disposed with uniform distribution around the center of gravity of the area. Accordingly, since the dense cylindrical body having relatively high strength is disposed in the distribution area without having any imbalance with respect to the center of gravity, the mechanical strength of the entire module is suitably secured. Preferably, for example, when one dense cylindrical body is disposed, this dense cylindrical body is placed at the center, and, when two or more dense cylindrical bodies are disposed, these dense cylindrical bodies are equally spaced out on a circumference whose center coincides with the center of gravity of the distribution area.

In a preferred form of the first to fourth aspect of the inventions, in an aspect in which the dense cylindrical body is provided, a plurality of dense cylindrical bodies are disposed on the side of the outer periphery of the plurality of porous cylindrical bodies. Accordingly, since the plurality of porous cylindrical bodies having relatively low strength are located on the side of the inner periphery of the plurality of dense cylindrical bodies having relatively high strength, the porous cylindrical body can be further prevented from being broken than a case in which the plurality of porous cylindrical bodies are located on the side of the outer periphery of the plurality of dense cylindrical bodies.

It is to be noted that the dense cylindrical body functions as a passage of a separated fluid (for example, the predetermined gas) and does not contribute to fluid separation (for example, gas separation). Therefore, what is required of the dense cylindrical body is to have a flow cross-sectional area to such an extent as not to act as flow resistance against a gas that has passed through the porous cylindrical body. If an excessive number of dense cylindrical bodies are provided, space efficiency will be lowered. Therefore, from the viewpoint of space efficiency, it is preferable to keep the number of dense cylindrical bodies small within the range where a necessary flow cross-sectional area can be secured. If the number of dense cylindrical bodies is one, the space efficiency will become highest. If a small number of dense cylindrical bodies are provided, it is preferable to dispose these on the side of the inner periphery of the porous cylindrical bodies, in consideration of the distribution of mechanical strength.

In a preferred form of the first to fourth aspect of the inventions, in an aspect in which the dense cylindrical body is provided, the dense cylindrical body may be structured to have the same opening area as the porous cylindrical body, or may be structured to have an opening area smaller or larger than the porous cylindrical body. However, if the opening area thereof is made excessively large, the volume occupied by the porous cylindrical body that contributes to gas separation in the total volume of the porous cylindrical-body module becomes small, and therefore the yield is lowered. If the opening area thereof is made excessively small, flow resistance is raised, and the yield is lowered. Therefore, it is preferable to determine the opening area of the dense cylindrical body so as to have a suitable size corresponding to a gas flow rate in the plurality of porous cylindrical bodies.

In the first to fourth aspect of the inventions, although the porous cylindrical body (the porous cylindrical body and the dense cylindrical body in an aspect in which the dense cylindrical body is provided) has the shape of a circular cylinder as a suitable shape, for example, it may be a variously-shaped cylinder such as a square-shaped cylinder (i.e., a square hollow-pillar).

In the first to fourth aspect of the inventions, the number of the porous cylindrical bodies is appropriately determined to be two or more in accordance with the dimensions or the purpose of use of an enclosed container (for example, airtight container) to be used, and the number of the dense cylindrical bodies is appropriately determined to be one or more in balance with flow resistance or space efficiency.

In a preferred form of the first and fourth aspect of the inventions, the hollow sealing body is made up of a supporting portion through which the one end of each of the plurality of porous cylindrical bodies and the one end of the dense cylindrical body are caused to pass and a lid portion airtightly fastened to one surface of the supporting portion so as to form a gas chamber between the supporting portion and the lid portion. Accordingly, the porous cylindrical body and the dense cylindrical body are bundled together by the supporting portion, and the gas chamber is formed by fastening the lid portion to the supporting portion. Additionally, since the hollow sealing body is made up of at least two members including an end connecting member and a lid member, the porous cylindrical body and the dense cylindrical body can be easily connected to the hollow sealing body. The gas chamber is created by, for example, a concave portion that is formed by hollowing at least one of the supporting portion and the lid portion and that faces the other one. The supporting portion is, for example, a planar end-connecting member that has a plurality of through-holes into which the dense cylindrical body is inserted and airtightly fixed. The plurality of through-holes are bored through the planar end-connecting member from one surface to the other surface thereof.

In a preferred form of the first and fourth aspect of the inventions, in an aspect in which the dense cylindrical body is provided, the porous cylindrical-body module includes a functional layer that is fastened to an inner wall surface of the dense cylindrical body and that has a predetermined function. Accordingly, a fluid (for example, gas) that has permeated the porous cylindrical body and that has flowed into the dense cylindrical body is brought into contact with the functional layer provided on the inner wall surface thereof in the course of flowing toward the other end of the dense cylindrical body. Therefore, the porous cylindrical-body module can be used for various purposes, such as gas modification, in accordance with the function of the functional layer. In other words, since the peripheral wall of the dense cylindrical body is impermeable to a fluid (for example, the predetermined gas), no influence is exerted on the permeability of the entire module even if a certain layer (or membrane) is formed on the inner wall surface thereof, and, since the fluid is brought into contact with the inner wall surface for a long time in the course of flowing through the interior of the dense cylindrical body, it is possible to suitably react to the fluid by providing the functional layer on the inner wall surface. For example, when a catalyst layer is used as the functional layer, harmful components of the fluid that have been separated can be removed, decreased, or rendered harmless in accordance with the composition of a catalyst thereof. When an adsorption layer is used as the functional layer, impurities of water, or the like, contained in the separated fluid can be adsorbed and thereby be removed or decreased in accordance with the composition of an absorbent material thereof. The second and third inventions are advantageously applicable to the thus structured porous cylindrical-body module.

That is, the porous cylindrical-body module of the first and fourth inventions and the porous cylindrical-body module to which the second and third inventions are to be applied are used for gas separation in a state of not being provided with a functional layer, and, in addition, are advantageously used to adsorb and remove the slight quantity of impurities contained in gas by being provided with a functional layer. For example, in gas separation, the porous cylindrical-body module can be used to separate hydrogen from a mixed gas of hydrogen and nitrogen, to separate hydrogen from a mixed gas of hydrogen and methane, or to separate hydrogen from a mixed gas of hydrogen and oxygen. Without being limited to hydrogen, gas to be separated may be a proper mixed gas if gas molecules have mutually different molecular diameters (preferably, as greatly different molecular diameters as possible).

In a preferred form of the fourth aspect of the invention, the porous cylindrical-body module may include one or two or more porous cylindrical bodies the other end of each of which is closed, in addition to the plurality of porous cylindrical bodies both ends of each of which are opened. Since a sweep gas is not sent into the interior of the porous cylindrical body the other end of which is closed, the porous cylindrical-body module constructed as above is more unfavorable than a case in which a sweep gas is sent from the other ends of all porous cylindrical bodies, but a serious functional hindrance does not occur even if the porous cylindrical-body module constructed as above is provided.

In a preferred form of the first and fourth aspect of the inventions, the porous cylindrical-body module has its constituent members made of ceramic materials, and the second and third inventions are advantageously applicable to this module. Although the porous cylindrical-body module can be made of other various metallic or resinous materials according to a use environment if the porous cylindrical-body module has gas permeability, strength, or heat resistance according to the purpose of use, ceramic materials can be advantageously used for gas separation because these have superior environment resistance. Alumina ceramics, a mixed material of alumina and silica (for example, mullite), etc., can be advantageously used as the ceramic materials, but the ceramic materials are not limited to these.

In a preferred form of the first to fourth aspect of the inventions, the porous cylindrical body is made of ceramics, synthetic resin, or metal, and especially made of alumina ($Al_2O_3$) or mullite ($3Al_2O_3$-$2SiO_2$).

In a preferred form of the first to fourth aspect of the inventions, the hollow sealing body, the supporting body, the lid member, and the supporting member are each made of ceramics, synthetic resin, or metal, and especially made of alumina or mullite.

In a preferred form of the first to fourth aspect of the inventions, in an aspect in which the dense cylindrical body is provided, the dense cylindrical body is made of the same material or the same-base material as the porous cylindrical body, as the hollow sealing body, as the supporting body, and as the supporting member, but, without being limited to these, the dense cylindrical body may be made of a different-base material. That is, the dense cylindrical body can be made of an appropriate material selected from ceramics, synthetic resin, metal, etc. However, if the porous cylindrical-body module is used in an environment in which a severe temperature change occurs, it is preferable to make the dense cylindrical body of a material as small as possible in differences with the other constituent materials in the thermal expansion coefficient. For example, metal, such as Kovar, is advantageously used when used in combination with ceramics.

In the first to fourth inventions, the number of the porous cylindrical bodies (the porous cylindrical bodies and the dense cylindrical body in an aspect in which the dense cylindrical body is provided), the outer diameter, the inner diameter, and the length of each porous cylindrical body can be appropriately changed in accordance with, for example, the purpose of use of the porous cylindrical-body module. Additionally, the porous cylindrical body and the dense cylindrical body are not required to have the same cross-sectional size or the same cross-sectional shape. Still additionally, the porous cylindrical body can be formed to have various cross-sectional shapes such as a circular or square cross-sectional shape.

In the second and third inventions, the supporting member is formed of, for example, a disk-shaped end cap having a circular closed-end hole or through-hole. However, if airtightly fastened to the porous cylindrical body, it is permitted to divide the supporting member in the circumferential direction. Likewise, in the first and fourth inventions, the hollow sealing body, the closing-and-sealing body, and the supporting body can be each divided in the circumferential direction.

BRIEF DESCRIPTION OF THE DRAWINGS

The above and other objects, features, advantages and technical and industrial significances of the present invention will be better understood by reading the following detailed description of presently preferred embodiment of the invention, when considered in connection with the accompanying drawings, in which.

DETAILED DESCRIPTION OF THE PREFERRED EMBODIMENTS

Embodiments of the present invention will be hereinafter described in detail with reference to the drawings. In the embodiments, the drawings are appropriately simplified or modified, in which each constituent part is not completely drawn at an accurate dimensional ratio or in an accurate shape.

Figure 1:
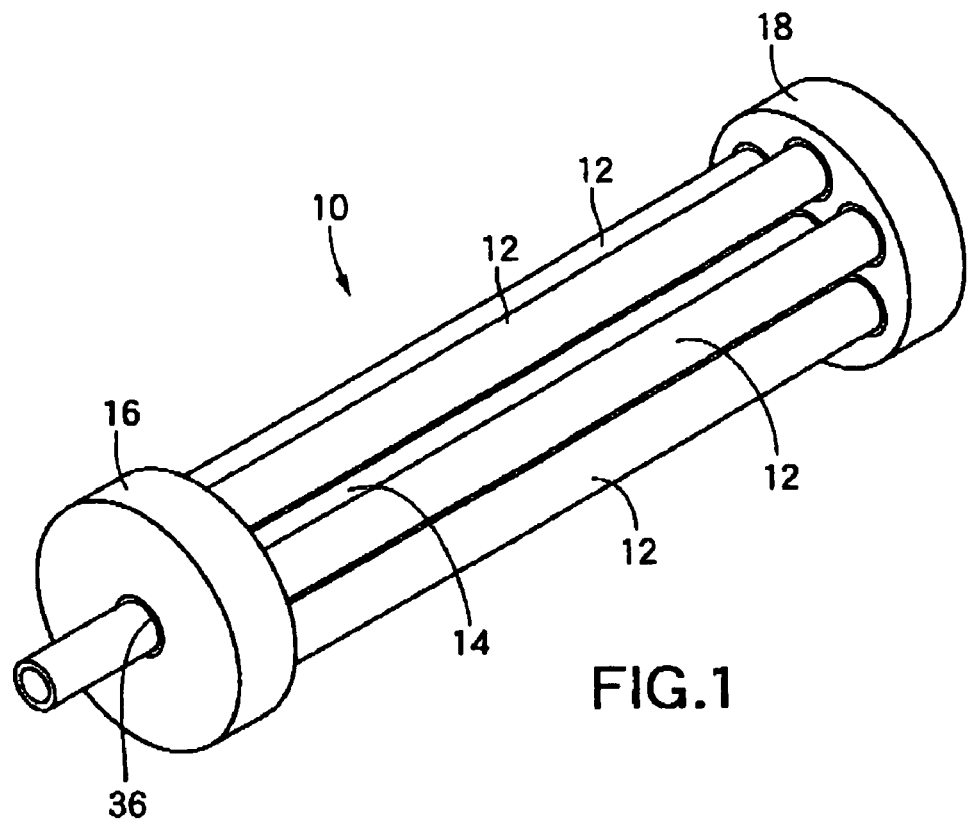
FIG. 1 is a perspective view showing the whole of a porous cylindrical-body module according to an embodiment of a first invention.
Figure 2:
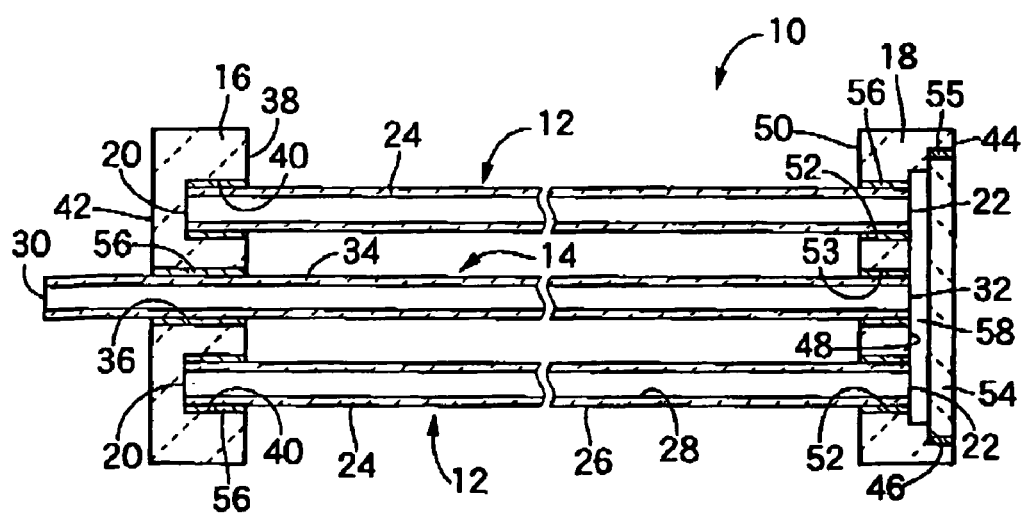
FIG. 2 is a longitudinal sectional view of the porous cylindrical-body module of FIG. 1.

FIG. 1 is a perspective view showing the whole of a porous cylindrical-body module (hereinafter, referred to simply as "module") 10 according to an embodiment of a first invention, and FIG. 2 is a sectional view in the longitudinal direction of the module, in which an intermediate part thereof is omitted. In FIG. 1 and FIG. 2, the module 10 is made up of a plurality of porous circular cylinders (for example, six porous circular cylinders) 12, one porous circular cylinder 14, end caps 16 and 18 fitted to both ends, respectively, of the porous circular cylinders 12 and the dense circular cylinder 14.

The porous circular cylinder 12 has, for example, an outer diameter of about 6 (mm), an inner diameter of about 4 (mm), a linear dimension of about 400 (mm), and an annular cross section. One end 20 and the other end 22 of the porous circular cylinder 12 are each opened. The porous circular cylinder 12 is made of, for example, porous alumina ceramics or porous mullite ceramics whose porosity is about 30 to 40(%). Multiple minute pores having a mean pore diameter of, for example, about 4 (nm) are formed to communicate from the outer surface 26 with the inner surface 28 of a peripheral wall 24 of the porous circular cylinder 12. The peripheral wall 24 is permeable to gas such as nitrogen or hydrogen.

The dense circular cylinder 14 has, for example, an outer diameter of about 6 (mm), an inner diameter of about 4 (mm), a linear dimension of about 500 (mm), and an annular cross section. A first end 30 and a second end 32 of the dense circular cylinder 14 are each opened. The dense circular cylinder 14 is made of, for example, dense alumina ceramics or dense mullite ceramics whose porosity is about 0 to 5(%), which means that the dense circular cylinder 14 is sufficiently denser than the porous circular cylinder 12. A peripheral wall 34 of the dense circular cylinder 14 is impermeable to gas. In this embodiment, the first end 30 corresponds to the other end, and the second end 32 corresponds to the one end.

The end caps 16 and 18 are each made of dense alumina ceramics or dense mullite ceramics as in the dense circular cylinder 14, and are shaped like a substantially circular plate. The end cap 16 has a through-hole 36 bored there through in the thickness direction at the middle there of and a plurality of closed-end holes (for example, six closed-end holes) 40, which are opened in one surface 38 facing the end cap 18, around the through-hole 36. The through-hole 36 is placed at the center of the end cap 16, and the closed-end holes 40 are spaced out on a circumference around the through-hole 36 at regular intervals, i.e., at intervals of, for example, about 60 degrees.

The end cap 18 has an annular stepped portion 46 formed on one surface 44 on the opposite side of the end cap 16. The end cap 18 additionally has a concave portion 48 formed on the inner periphery of the stepped portion 46. The concave portion 48 has a plurality of through-holes (for example, seven through-holes) 52 and 53 bored through the end cap 18 from the side of the one surface 44 to the other surface 50. Among the seven through-holes 52 and 53, one (i.e., through-hole 53) is placed at the center of the end cap 18, and the remaining six (i.e., through-holes 52) are spaced out on a circumference around the one through-hole 53 at regular intervals. The diameter of the circumference on which the six through-holes 52 are placed is almost the same as the diameter of the circumference on which the closed-end holes 40 are placed.

A disk-shaped end cover 54 with which the concave portion 48 is closed is airtightly fastened to the one surface 44 of the end cap 18, for example, with a seal portion 55 made of a sealing material such as seal glass, so that a gas chamber 58 is created therebetween. As in the end cap 1B, the end cover 54 is made of dense alumina ceramics or the like and is impermeable to gas. The sealing material is, for example, silica-alumina-calcia-based glass.

The porous circular cylinder 12 and the dense circular cylinder 14 are caused to pierce through the through-holes 36, 52, and 53 of the thus structured end caps 16 and 18, and are fitted to the closed-end holes 40. These porous circular cylinder 12 and dense circular cylinder 14 are each tightly sealed with a seal portion 56 made of a sealing material such as seal glass. As a result, as is apparent from FIG. 2, the one end 20 of the porous circular cylinder 12 is closed with the dense end cap 16, and the other end 22 thereof is opened to the gas chamber 58 formed between the dense end cap 18 and the dense end cover 54. On the other hand, the first end 30 of the dense circular cylinder 14 is projected from the side of the other surface 42 of the end cap 16 and is opened, and the second end 32 thereof is opened to the gas chamber 58. Therefore, gas that has permeated the peripheral wall 24 of the porous circular cylinder 12 and has entered the interior of the porous circular cylinder 12 flows from the opened other end 22 toward the gas chamber 58, then flows into the dense circular cylinder 14 from the second end 32 thereof, then flows therethrough toward the first end 30 thereof, and flows out from the opened first end 30. In this embodiment, the end cap 16 serves as a closing-and-sealing body, and the end cap 18 and the end cover 54 constitute a hollow sealing body. The through-hole 53 to which the dense circular cylinder 14 is fitted serves as a gas passage.

The thus structured module 10 is formed by producing the end caps 16 and 18, the end cover 54, the porous circular cylinder 12, and the dense circular cylinder 14, which have the aforementioned characteristics, according to well-known ceramic manufacturing technology and by combining and fastening these together. The end caps 16, 18 and the end cover 54 are molded, for example, according to powder press molding and cutting operations. The porous circular cylinder 12 and the dense circular cylinder 14 are molded, for example, according to extrusion molding, cold isostatic press molding, and cutting operations. Raw materials that have different sintering characteristics or include additives in accordance with a desired porosity are appropriately used. In order to obtain necessary size and shape accuracy, the cylinders 12 and 14 are appropriately subjected to grinding treatment after being sintered.

After producing each constituent part, for example, the dense circular cylinder 14 is caused to pass through the end cap 16, and thereafter the porous circular cylinder 12 is inserted thereinto, and the dense circular cylinder 14 and the porous circular cylinder 12 are fastened with the sealing material 56. The end cap 18 is then fitted to the other ends of the dense circular cylinder 14 and the porous circular cylinder 12 and is fastened with the sealing material 56, and thereafter the end cover 54 is fitted to the one surface 44 of the end cap 18 and is fastened with the sealing material 56, thus producing the module 10.

Figure 3:
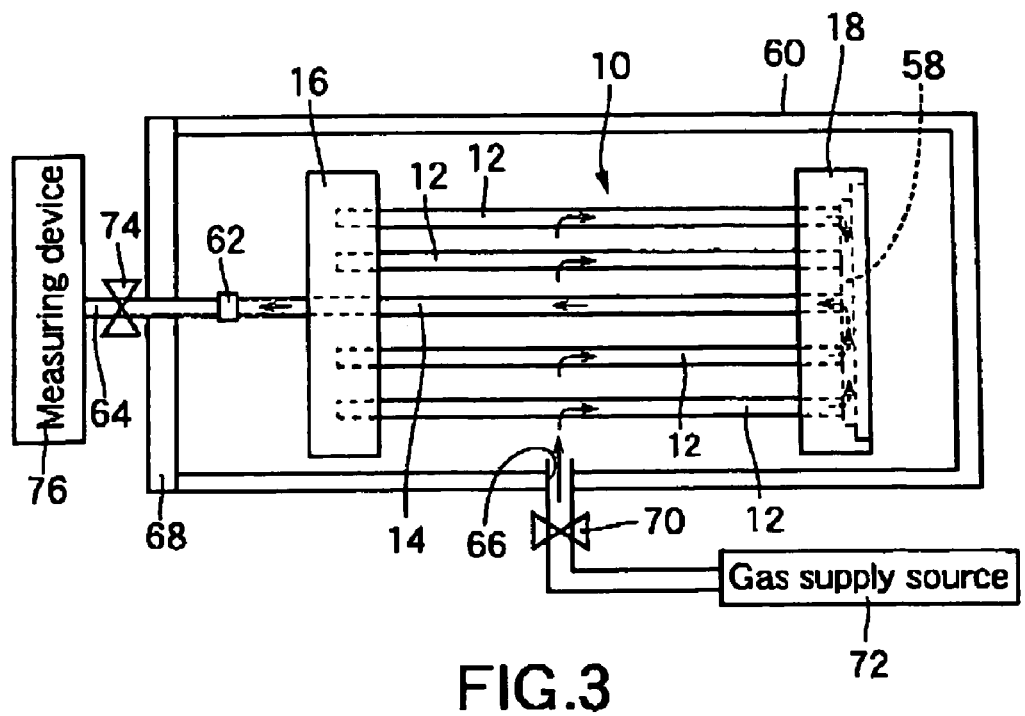
FIG. 3 is a schematic view showing the porous cylindrical-body module of FIG. 1 housed in an airtight container.

FIG. 3 is a schematic view for explaining a use state of the module 10. In FIG. 3, the module 10 is fixed by a fixing device and the like, not shown, in a reaction container 60. The open end of the dense circular cylinder 14 protruding from the end cap 16 is airtightly connected to a gas lead-out opening (i.e., gas inlet) 64 by means of a joint 62. The reaction container 60, which is airtightly formed, has a gas lead-in opening 66 at its side face and a gas lead-out opening (i.e., gas recovering opening) 64 at its left end. The gas lead-out opening 64 is formed in a lid 68 of the reaction container 60. The lid 68 is airtightly attached to the main body of the container 60 by means of a fastening device, such as a bolt, not shown. A gas supply source 72 is connected to the gas lead-in opening 66 through a valve 70, whereas a measuring device 76 for measuring a gas flow rate and the like through a valve 74 is connected to the gas lead-out opening 64. In other words, the module 10 is disposed in the airtight reaction container 60, and the dense circular cylinder 14 is airtightly connected to the gas lead-out opening 64, but no airtight partition exists in the reaction container 60.

In this apparatus structure, when the valves 70 and 74 are opened to supply a predetermined gas, such as nitrogen, from the gas supply source 72 into the reaction container 60, a supplied gas permeates the peripheral wall of the porous circular cylinder 12, which is the only flow path, and flows into the interior of the porous circular cylinder 12, because the reaction container 60 is airtightly formed. In FIG. 3, arrows represent the flow direction of gas. The gas that has flowed into the interior of the porous circular cylinder 12 flows toward the gas chamber 58, and flows into the interior of the dense circular cylinder 14 through the gas chamber 58. The gas is then guided from the dense circular cylinder 14 to the measuring device 76 through the gas lead-out opening 64. That is, since the gas flow path is structured in this way, the side of the gas lead-out opening 64 of the dense circular cylinder 14 has relatively negative pressure, and therefore, when gas is supplied from the gas supply source 72 under suitable pressure, the gas permeates the peripheral wall 24 of the porous circular cylinder 12, and all of the gas that has permeated it flows to the dense circular cylinder 14. Additionally, since the dense circular cylinder 14 is airtightly connected to the gas lead-out opening 64, gas that has been introduced into the reaction container 60 is sent to the gas lead-out opening 64 only by the path following the dense circular cylinder 14 through the porous circular cylinder 12. Therefore, a gas flow rate measured by the measuring device 76 is a permeation flow rate of the module 10.

Figure 18:
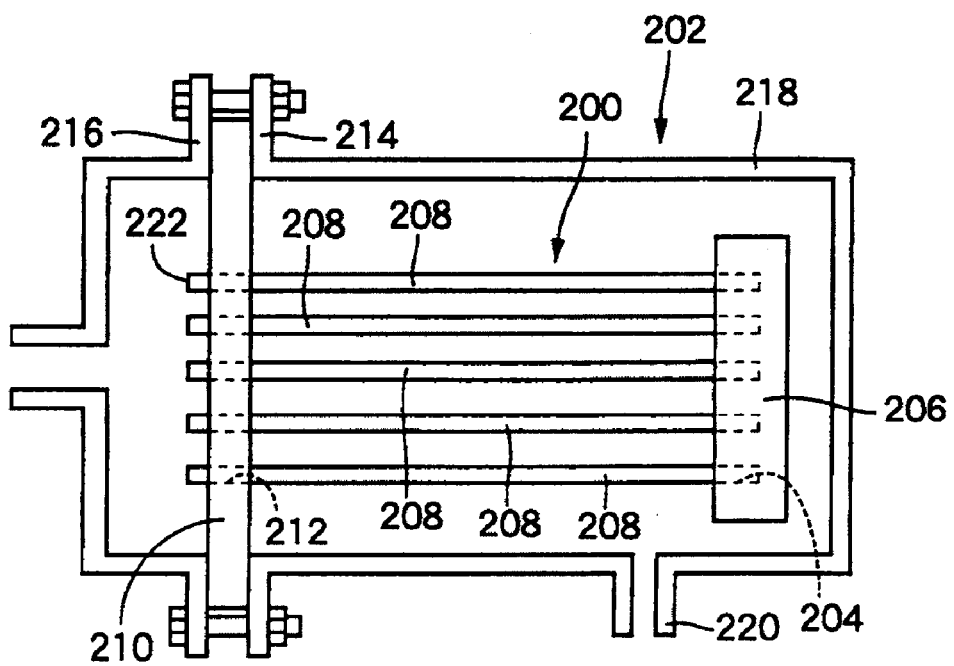
FIG. 18 is a sectional view of a gas separator for explaining a structure of a conventional porous module.
Figure 19:
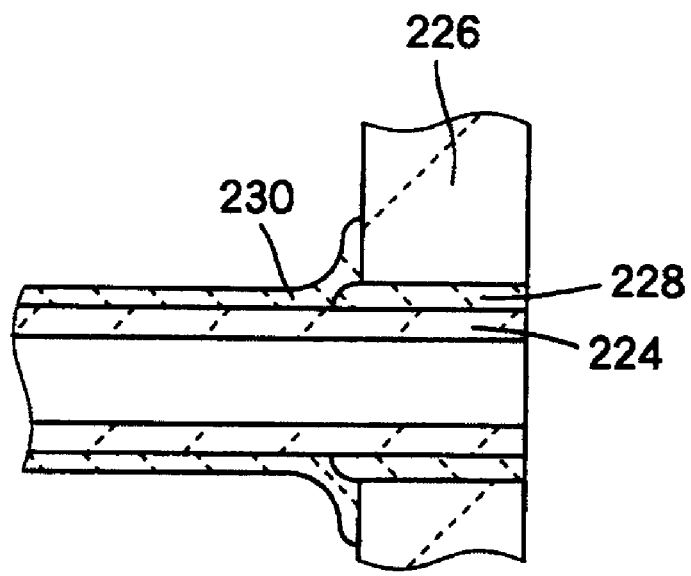
FIG. 19 is a sectional view for explaining an example of a junction structure of a conventional end cap.

The following table 1 shows the results of permeation flow rates measured when nitrogen gas is caused to flow while variously changing the constituent material of the porous circular cylinder 12 of the module 10 in this apparatus structure. In each example shown below, the same structure was employed as the foregoing structure, except that the pore diameter of the porous circular cylinder 12 was changed by changing the constituent material. As shown below, it was ascertained that the permeation flow rate can be measured with no trouble even when the porous circular cylinder 12 that constitutes the module 10 has the following various pore diameters. That is, even when a bundle structure is employed as shown in this embodiment, it was understood that there is no difference in characteristics between the conventional bundle structure shown in FIG. 18 and that in this embodiment.

TABLE 1

|  | Example 1 | Example 2 | Example 3 | Example 4 | Example 5 |
|---|---|---|---|---|---|
| Porous circular cylinder constituent material | Alumina | Alumina | Alumina + Silica | Alumina | Alumina + Silica |
| Pore diameter (nm) | 4 | 10000 | 0.5 | 4 | 0.5 |
| Temperature in container (° C.) | 600 | 600 | 600 | 100 | 600 |
| Gas supply pressure (MPa) | 0.1 | 0.1 | 0.1 | 0.1 | 1.0 |
| Permeation flow rate (L/min) | 6 | 100 | 1 | 10 | 10 |

In brief, according to this embodiment, the other end 22 of each of the plurality of porous cylindrical bodies 12 the one end 20 of each of which is closed is opened to the gas chamber 58 between the end cap 18 and the end cover 54, and the end cap 18 is provided with the through-hole 53 leading from the gas chamber 58 outward, and the gas chamber 58 leads outward by means of a path passing through the through-hole 53 and through the porous cylindrical body 12. Therefore, the module 10 can have a gas-passing path from the peripheral wall 24 of the porous cylindrical body 12 outward through the gas chamber 58 and through the through-hole 53. Therefore, gas that has permeated the peripheral wall 24 of the porous cylindrical body 12 from its outside part to its inside part is discharged from the through-hole 53 outward, i.e., to the measuring device 76. Thus, what is at least required to measure the permeability and the like of the module 10 is to house the module 10 in the reaction container 60, then airtightly connect the through-hole 53 to the gas lead-out opening 64, and airtightly seal the reaction container 60. Therefore, since the airtight sealing structure of the whole of the reaction container 60 can be formed independently of the airtight connecting structure of the through-hole 53 and the gas lead-out opening 64, the permeability and the like of the module 10 that has various dimensions can be measured by means of a common reaction container 60 formed to have a predetermined size and structure by forming the through-hole 53 in a predetermined form corresponding to the connecting structure with the gas lead-out opening 64, regardless of the size of the whole of the module 10.

Moreover, in this embodiment, the module 10 includes the dense cylindrical body 14 in which the second end 32 is opened to the gas chamber 58 by being airtightly fastened to the through-hole 53 and in which the first end 30 is opened outside. Therefore, the through-hole 53 and the gas lead-out opening 64 can be airtightly connected together by airtightly connecting the first end 30 of the dense cylindrical body 14 opened at the outer part of the end cap 18 to the gas lead-out opening 64 of the reaction container 60. Therefore, connecting operations can be more easily performed, and airtightness can be more easily obtained than a case in which the through-hole 53 is connected directly to the gas lead-out opening 64.

Additionally, in this embodiment, since the module 10 includes the end cap 16 which is airtightly fastened to the porous cylindrical body 12 and with which the one end 20 of the porous cylindrical body 12 is closed, the manufacture can be more easily carried out, and the closed structure can be more easily formed than a case in which the porous cylindrical body 12 is formed in a state in which the one end 20 is beforehand closed or a case in which the one end 20 of each porous cylindrical body 12 is individually closed. Still additionally, advantageously, the mechanical strength of the whole of the module 10 is raised because the porous cylindrical body 12 is further united by the end cap 16 on the side of the one end 20 of the porous cylindrical body 12.

Additionally, in this embodiment, since the dense cylindrical body 14 that is superior in denseness and in mechanical strength to the porous cylindrical body 12 is provided between the end caps 16 and 18, the mechanical strength is further raised.

Next, a description will be given of another embodiment of the first invention. In the following embodiment, the same reference symbols as in the aforementioned embodiment are given to the same or equivalent parts, and a description thereof is omitted.

Figure 4:
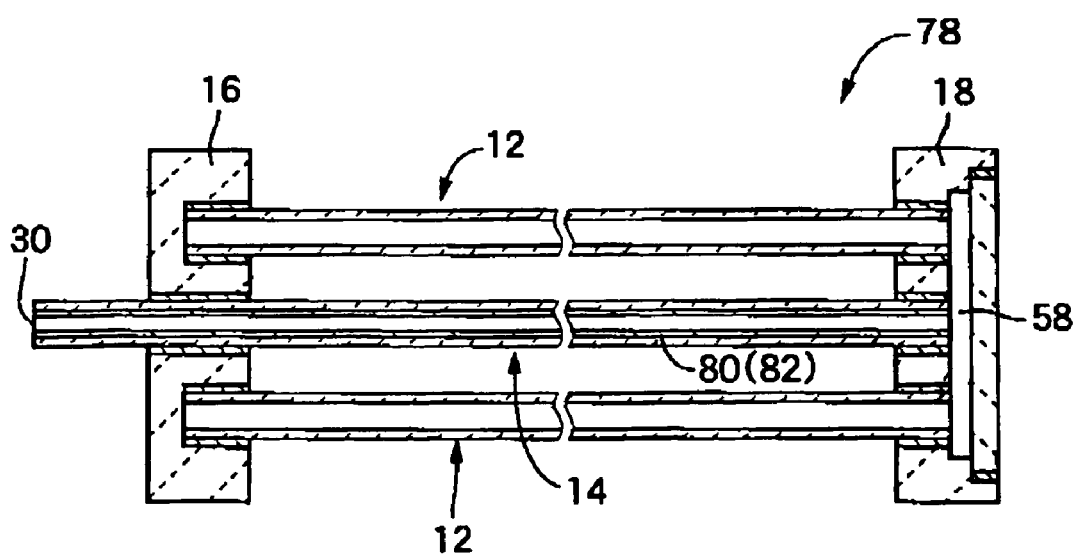
FIG. 4 is a longitudinal sectional view of a porous cylindrical-body module according to another embodiment of the first invention.

A module 78 shown in FIG. 4 has a catalyst layer 80 fastened to the inner wall surface of the dense circular cylinder 14, and the other structures are completely the same as the module 10. The catalyst layer 80 is made of alumina that contains platinum, for example, by a ratio of about 0.1 (wt %), and has a thickness of, for example, about 100 (μm) over the whole length of the dense circular cylinder 14. In the thus structured module 78, when gas flows into the dense circular cylinder 14 through the porous circular cylinder 12 and through the gas chamber 58, the gas is caused to flow toward the open end 30 while being in contact with the catalyst layer 80 provided on the inner wall surface of the dense circular cylinder 14. Therefore, since the gas is caused to react to the catalyst during flow, a harmful gas or the like can be removed.

For example, in a case in which gas to be sent from the gas supply source 72 is a mixed gas of $H_2$, $H_2O$, and $O_2$, when the gas was caused to flow at a flow rate of about 100 (ml/min), the CO concentration in the mixed gas was 1000 (ppm) on the supply side, while the CO concentration was lowered to about 8 (ppm) on the outlet side. When the gas was caused to flow at a flow rate of about 1000 (ml/min) under the same condition of the CO concentration on the supply side, the CO concentration on the outlet side was able to be lowered to about 50 (ppm). In a case in which the mixed gas to be introduced is a mixed gas of air and hydrogen, when the VOC concentration on the supply side was about 10000 (ppm) at a flow rate of about 1000 (ml/min), the VOC concentration was able to be lowered to about 500 (ppm) on the outlet side.

Another catalyst layer instead of the catalyst layer 80 can be provided to remove a slight quantity of impurities in gas. Alternatively, an adsorption layer 82 can be provided instead of the catalyst layer 80. For example, if the adsorption layer 82 that contains magnesium and a lithium compound is provided, $CO_2$ in gas can be removed. If the adsorption layer 82 is formed of silica gel or a molecular sieve, a slight quantity of water contained in gas can be removed.

Figure 5:
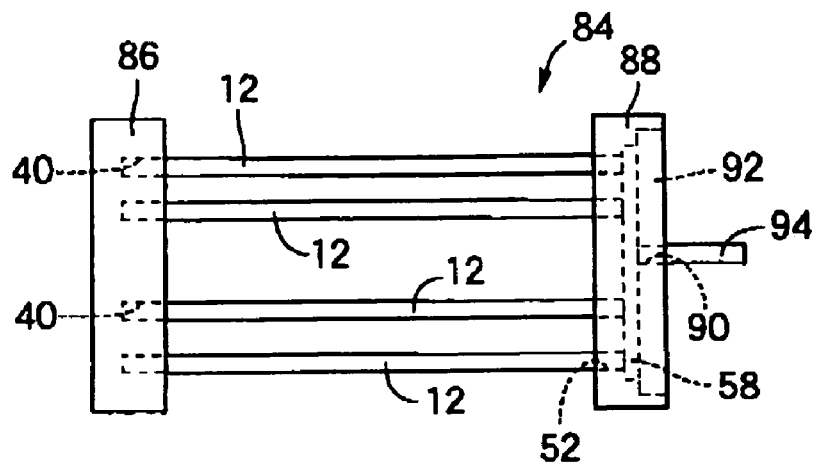
FIG. 5 is a longitudinal sectional view of a porous cylindrical-body module according to still another embodiment of the first invention.

FIG. 5 is a side view showing a module 84 according to still another embodiment. This module 84 is made up of an end cap 86 having the closed-end hole 40 but not having the through-hole 36, an end cap 88 having the through-hole 52 but not having the through-hole 53, an end cover 92 having a through-hole 90, a plurality of porous circular cylinders 12, and a dense circular cylinder 94 shorter than the dense circular cylinder 14. Likewise, in this module 84, the one end of the dense circular cylinder 94 and the one end of the porous circular cylinder 12 are opened to the gas chamber 58, and the other end of the porous circular cylinder. 12 is closed with the end cap 86, and therefore, contrary to the module 10, a direction in which gas is ejected is faced toward the end cap 88 provided with the gas chamber 58. However, the module 84 can be used in the same way as the module 10.

Figure 6:
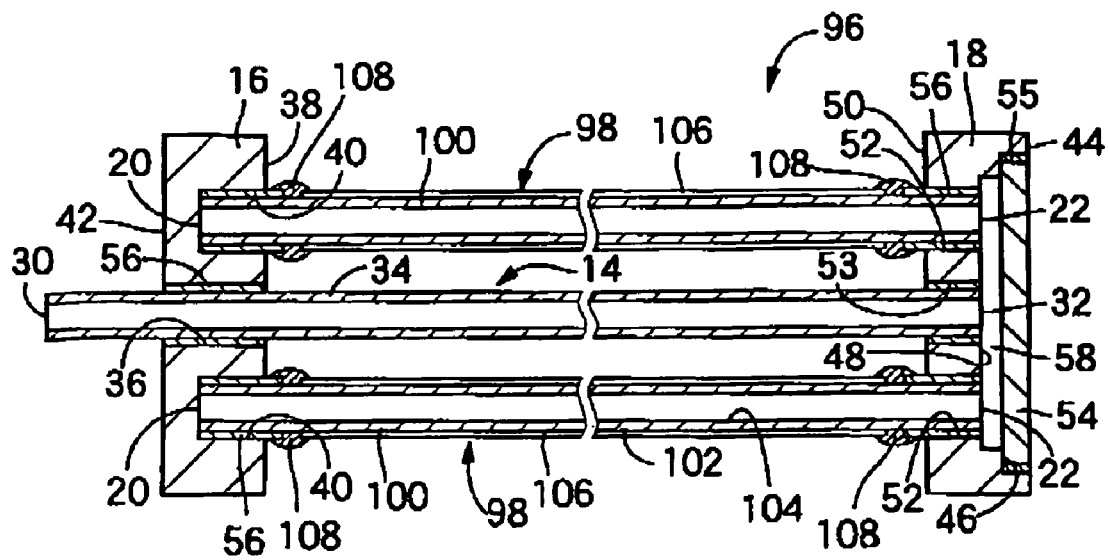
FIG. 6 is a longitudinal sectional view of a porous cylindrical-body module having a supporting structure according to an embodiment of a second invention.

FIG. 6 is a sectional view corresponding to FIG. 2 for explaining a supporting structure of the second invention and an embodiment of a method for producing the supporting structure. A module 96 in this embodiment is constructed in the same way in its almost whole structure as the module 10, and there is a difference only in the structure of a porous circular cylinder 98 provided instead of the porous circular cylinder 12 and in the structure for supporting the porous circular cylinder 98 and the dense circular cylinder 14. Therefore, a description will be hereinafter given focusing on this respect.

The porous circular cylinder 98 has, for example, an outer diameter of about 10 (mm), an inner diameter of about 7 (mm), a linear dimension of about 400 (mm), and an annular cross section, and differs from that of the module 10 in outer diameter and in inner diameter. As in the module 10, the porous circular cylinder 98 is made of, for example, porous alumina ceramics or porous mullite ceramics whose porosity is about 30 to 40(%). The mean pore diameter of each of multiple pores formed to lead from the outer surface 102 to the inner surface 104 of a peripheral wall 100 of the porous circular cylinder 98 is, for example, about 60 (nm). This pore diameter allows gas such as nitrogen or hydrogen to pass between the outer and inner surfaces of the peripheral wall 100. The thermal expansion coefficient is about $7.7 \times 10^{-6}$ (/° C.).

A porous membrane 106 is provided on the outer circumferential surface of the porous circular cylinder 98 over almost the whole length except both ends thereof. The porous membrane 106 is made of, for example, porous ceramics such as alumina or silica and is tightly fastened to the cuter circumferential surface of the porous circular cylinder 98 with a thickness of, for example, 1 to 5 (μm), preferably about 3 (μm). In the porous membrane 106, the porosity is, for example, about 30 to 40(%), which is nearly the same as that of the porous circular cylinder 98, but the pore diameter is about 4 (nm), which is much smaller than that of the porous circular cylinder 98. The dense circular cylinder 14 has, for example, an outer diameter of about 10 (mm) and an inner diameter of about 7 (mm), and therefore differs from that of the module 10 in outer diameter and in inner diameter. Except for this difference, the other structures are formed in the same way as in the module 10.

The seal portion 56 used to fasten the porous circular cylinder 98 is provided so as to be slightly projected from the surfaces 38 and 50 of the end caps 16 and 18. The projection amount of the seal portion 56 is, for example, within a range of 1 to 10 (mm), preferably about 5 (mm). The seal portion 56 and the porous membrane 106 are disposed slightly apart from each other in the longitudinal direction of the porous circular cylinder 98, and a seal portion 108 is annularly fastened therebetween while extending in the circumferential direction of the porous circular cylinder 98.

Figure 7:
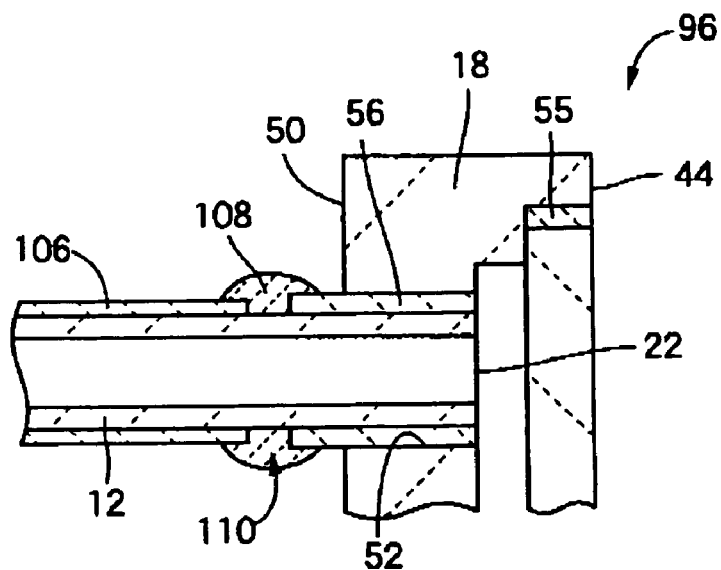
FIG. 7 is an enlarged sectional view of the main part of an end cap for explaining a junction structure of the end cap of the porous cylindrical-body module of FIG. 6.

FIG. 7 is an enlarged view of a junction part between the end cap 18 and the porous circular cylinder 98. A gap 110 of, for example, 10 (μm) to 1 (cm), preferably 5 (mm), is annularly formed between the seal portion 56 and the porous membrane 106. The seal portion 108 is provided in a slightly wider range than the gap 110. That is, the seal portion 108 is provided to overlap with the porous membrane 106 and with the seal portion 56. The junction part is formed in the same way on the side of the end cap 16 as shown in FIG. 6. Therefore, a part situated in the gap 110 of the outer circumferential surface of the porous circular cylinder 98 is covered with the seal portion 108, and the remaining part of the outer circumferential surface is covered with the porous membrane 106 or with the seal portion 56, and therefore the porous circular cylinder 98 is in a state in which the outer circumferential surface thereof is closed substantially with the porous membrane 106. In this embodiment, the end caps 16 and 18 serve as a supporting member, the seal portion 56 serves as a first seal portion, and the seal portion 108 serves as a second seal portion. A sealing material that constitutes the seal portion 56 is silica-alumina-calcia-based glass having, for example, a softening point of about 850 (° C.) and a thermal expansion coefficient of about $6.1 \times 10^{-6}$ (/° C.). A sealing material that constitutes the seal portion 108 is silica-based glass having, for example, a softening point of about 500 (° C.) and a thermal expansion coefficient of about $8.0 \times 10^{-6}$ (/° C).

In this embodiment, gas is caused to flow and is discharged and recovered from the first open end 30 in the same way as in the module 10 although there is a difference in the structure in the vicinity of the seal portion 56.

At this time, since the junction part between the porous circular cylinder 98 and the end caps 16 and 18 is airtightly formed by being sealed with the seal portions 56 and 108 as described above, gas that has permeated the peripheral wall 100 of the porous membrane 106 and that has entered the interior of the porous circular cylinder 98 can flow from the other end 22 into the gas chamber 58 without leaking out on the way.

For example, when nitrogen ($N_2$) gas was introduced from the one end 22 under a pressure of about 0.5 (MPa) in a state in which the end cap 16 was fastened and sealed with the seal portion 108, a leak in the junction part was never recognized, and it was ascertained that airtightness was being maintained.

Additionally, when the module 96 was repeatedly used in a temperature range of from room temperature to about 600 (° C.), no change occurred in the fastening strength between the end caps 16, 18 and the porous circular cylinder 98 and in the airtightness in the vicinity of the junction part, and it was ascertained that the original characteristics were being maintained.

The thus structured module 96 is formed by producing the end caps 16 and 18, the end cover 54, the porous circular cylinder 98, and the dense circular cylinder 14, which have the aforementioned characteristics, according to well-known ceramic manufacturing technology and by combining and fastening these together in the same way as the module 10. A producing method will also be described focusing on respects differing from the module 10.

Figure 8:
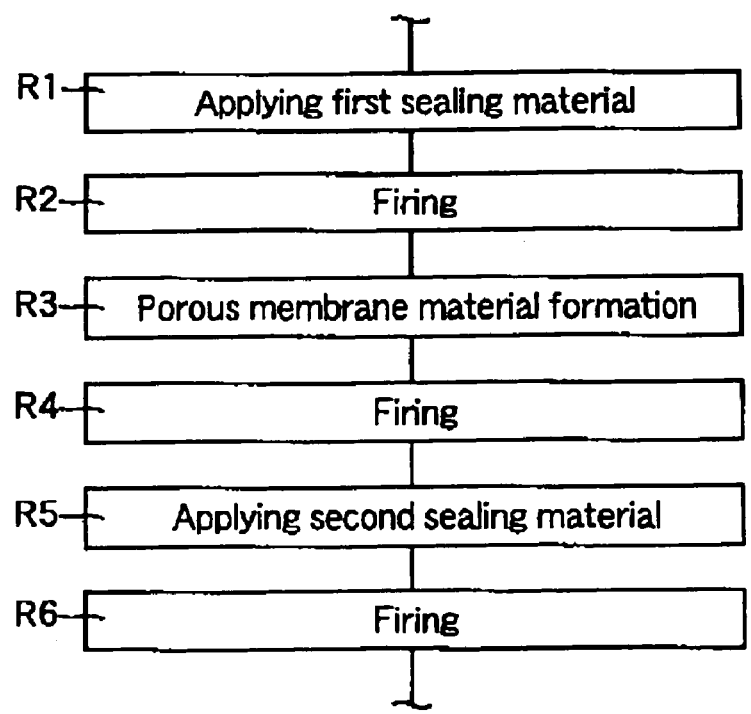
FIG. 8 is a flowchart for explaining the main steps of a method for producing the porous cylindrical-body module of FIG. 6, showing an embodiment of a third invention.

After each constituent part is produced, a step of fastening it to the end caps 16 and 18 is performed in accordance with, for example, a flowchart shown in FIG. 8. In greater detail, in a first sealing-material applying step R1, a glass-dispersed liquid, which is obtained by dispersing a first sealing material used to join the end caps 16 and 18 with the porous circular cylinder 98 and with the dense circular cylinder 14, i.e., for example, silica-alumina-calcia-based glass into a solvent or the like, is applied to a junction interface, and these are fitted together. This step may be performed sequentially or simultaneously with respect to each of the end caps 16 and 18. A step of placing the sealing material between the end caps 16 and 18 and the hollow cylinders 12 and 14 can employ an appropriate method, such as a method in which a glass ring constituting the sealing material is fitted between the end caps 16 and 18 and the hollow cylinders 12 and 14, instead of the first sealing-material applying step R1. In a firing step R2 subsequent thereto, the seal portion 56 is produced by carrying out a firing process at a glass firing temperature, i.e., for example, at a temperature of about 950 (° C.), and the end caps 16 and 18 are fastened to the porous circular cylinder 98.

Thereafter, in a porous-membrane material formation step R3, a dispersion liquid obtained by dispersing a powdered material, such as alumina, into a solvent or the like is applied to the outer circumferential surface of the porous circular cylinder 96 according to an appropriate method such as dipping or roller application. At this time, a range where the dispersion liquid is applied is set so that the gap 110 is created between the dispersion liquid and the seal portion 56. In a firing step R4 subsequent thereto, a porous membrane 106 is produced and fastened to the outer circumferential surface of the porous circular cylinder 98 by carrying out a firing process at an alumina-firing temperature, i.e., for example, at a temperature of about 650 (° C.). In this step, since the firing temperature is much lower than the firing processing temperature of the seal portion 56, the joining strength never becomes insufficient during the process.

Thereafter, in a second sealing-material applying step R5, a glass-dispersed liquid obtained by dispersing, for example, silica-based glass into a solvent or the like is applied to the gap 110, and, in a firing step R6, a firing process is carried out, for example, at a temperature of about 620 (° C.) at which the glass is fired. As a result, the seal portion 108 is generated from the dispersion liquid and is fastened to the seal portion 56, to the porous membrane 106, and to the outer circumferential surface of the porous circular cylinder 98, and thus the outer circumferential surface thereof is airtightly sealed up. At this time, since the firing temperature is lower than a membrane forming temperature of about 650 (° C.), the porous membrane 106 that has already been formed is neither deteriorated nor broken by this step.

The module 96 is produced by fastening the end caps 16 and 18, then carrying out a membrane-forming process, then fitting the end cover 54 to the end cap 18, and fastening these together with the seal portion 55 as described above.

When glass is subjected to temperatures between temperatures lower by, for example, about 250 (° C.) than the firing temperature which is set to be slightly higher than a softening point and the firing temperature, the glass is obviously liable to be softened, and a decrease occurs in the fastening strength of the seal portion 56 and the like. Therefore, since the firing temperature at which a joining operation is performed at the seal portion 56 is set at about 950 (° C.), the strength will become insufficient if the temperature is, for example, 700 (° C.) or so, but, in a temperature range of from room temperature to about 600 (° C.) which is much lower than the firing temperature, the joining strength gained by the seal portion 56 never becomes insufficient during use in this temperature range.

Figure 20:
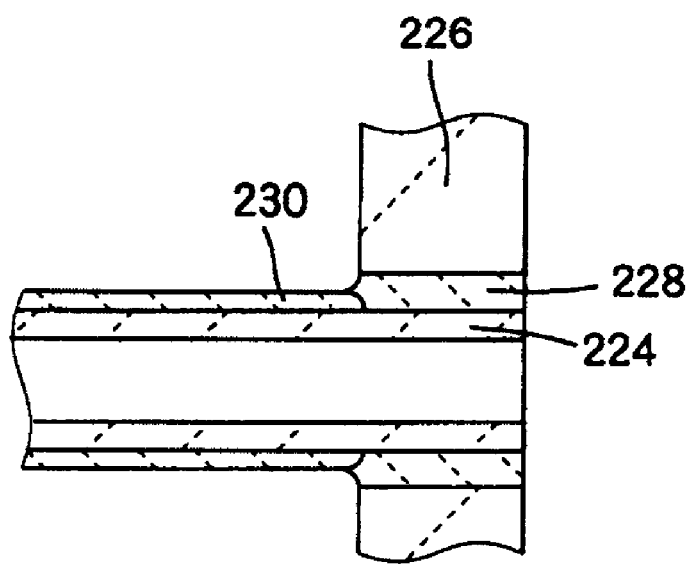
FIG. 20 is a sectional view for explaining another example of the junction structure of the conventional end cap.

In this connection, since the firing temperature of the porous membrane 106 is, for example, about 650 (° C.) as mentioned above, there is a need to seal the membrane at a lower temperature than the membrane-forming temperature after the membrane is formed, in order to prevent its change in quality. Therefore, when the end caps 16 and 18 are fastened after the membrane is formed, for example, as shown in FIG. 20, it is necessary to use a sealing material that can be sealed at a lower temperature than the membrane-forming temperature, i.e., at, for example, about 620 (° C.). However, in this case, about 370 (° C.) is the upper limit of temperatures used to maintain the fastening strength. In other words, according to this embodiment, the joining with the end caps 16 and 18 is performed at a high temperature before the porous membrane is formed, and therefore the module 96 that is usable even at a high temperature can be obtained.

In brief, in this embodiment, the end caps 16 and 18 and the porous circular cylinder 98 are fastened together with the seal portion 56 and are tightly sealed therebetween, while the outer circumferential surface of the porous circular cylinder 98 is sealed with the annular seal portion 108 provided at the boundary between the seal portion 56 and the porous membrane 106. Since the fastening strength of the end caps 16 and 18 and the porous circular cylinder 98 is secured by the seal portion 56, the seal portion 108 with which the boundary between the porous membrane 106 and the seal portion 56 is annularly covered is not required to contribute to the fastening of the end caps 16 and 18 and the porous circular cylinder 98. Therefore, since the seal portion 108 is formed by the use of a sealing material that is burned at a lower temperature than the membrane forming temperature after the porous membrane 106 is formed as described above, airtightness can be secured without deteriorating the porous membrane 106. Therefore, the end caps 16 and 18 can be joined tightly and with great strength to the porous circular cylinder 98 on which the porous membrane 106 is provided, and it is possible to obtain a supporting structure in which the outer circumferential surface of the porous circular cylinder 98 is sealed up.

Additionally, in this embodiment, the porous membrane 106 and the seal portion 56 are placed apart from each other, for example, by 10 ($\mu$m) to 1 (cm), and the gap 110 is formed therebetween. Therefore, since the porous membrane 106 is not in contact with the seal portion 56, stress resulting from, for example, a difference in the thermal expansion coefficient therebetween is prevented from acting on the porous membrane 106, and, consequently, the porous membrane 106 can be further kept unbroken.

The aforementioned embodiment shows an example of the airtight junction structure among the porous circular cylinder 98 and the end caps 16 and 18, and therefore the junction structure can employ various forms as described below. In the following modifications, the same reference symbols as in the aforementioned embodiment are given to the same or equivalent parts, and a description thereof is omitted.

Figure 9:
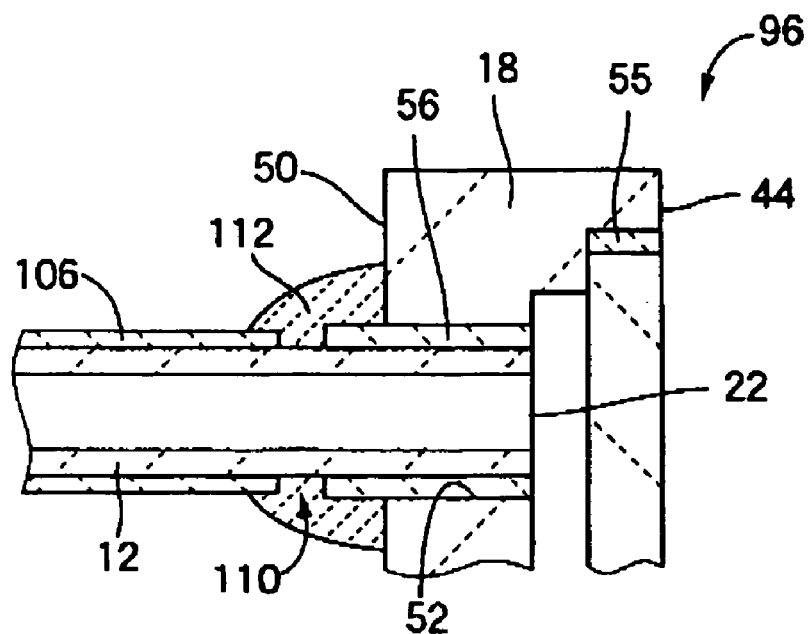
FIG. 9 is a view corresponding to FIG. 7 for explaining another example of the junction structure of the end cap.

Except for that the seal portion 112 being different in shape from the seal portion 108, a junction structure shown in FIG. 9 is the same as that shown in FIG. 7. In greater detail, although the aforementioned seal portion 108 is placed slightly apart from the end cap 18, the seal portion 112 of this embodiment is in contact with the surface 50 of the end cap 18. Therefore, advantageously, since the seal portion 112 is fastened to not only the seal portion 56 but also the end cap 18, the fastening strength and airtightness can be raised.

Figure 10:
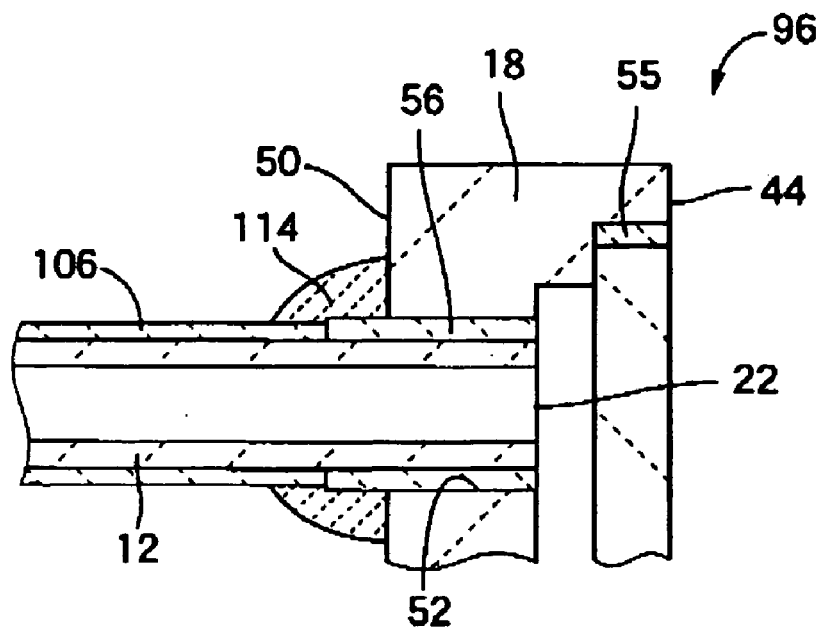
FIG. 10 is a view corresponding to FIG. 7 for explaining still another example of the junction structure of the end cap.

Although a junction structure shown in FIG. 10 has a seal portion 114 identical in shape with the seal portion 112, the porous membrane 106 is brought into contact with the seal portion 56, and therefore the gap 110 does not exist. Even in this structure, the seal portion 114 is firmly fastened to the seal portion 56 and to the end cap 18, and the boundary between the porous membrane 106 and the seal portion 56 is sealed with the seal portion 114. Therefore, sufficient fastening strength and airtightness can be secured. That is, although still greater strength can be obtained if the gap 110 exists, this is not indispensable.

Figure 11:
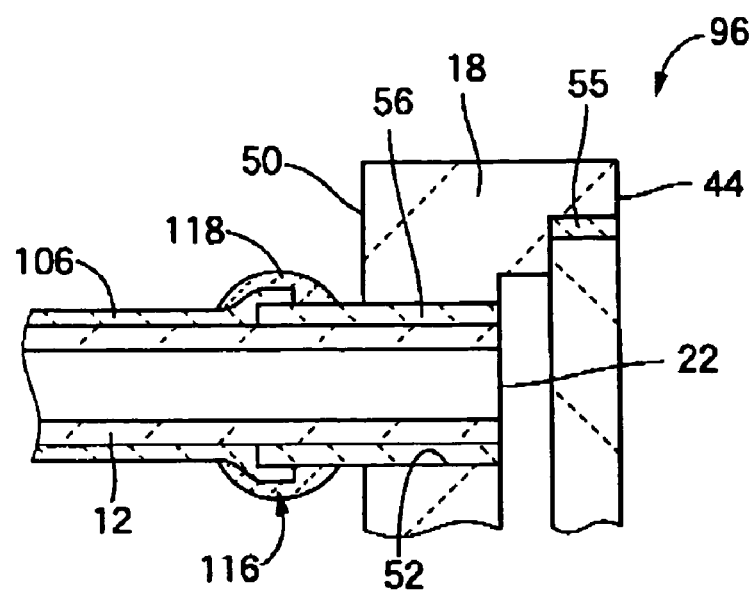
FIG. 11 is a view corresponding to FIG. 7 for explaining still another example of the junction structure of the end cap.

A junction structure shown in FIG. 11 is formed such that the porous membrane 106 is slightly overlapped with the seal portion 56, and a seal portion 118 is formed in a range wider than an overlapped part 116, i.e., a seal portion 118 is formed so that the left end of the seal portion 118 is positioned more leftward than the left end of the seal portion 56 and so that the right end of the seal portion 118 is positioned more rightward than the right end of the porous membrane 106 in the direction shown in FIG. 11. In a case in which the porous membrane 106 is overlapped with the seal portion 56 in this way, the whole of the overlapped part is covered with the seal portion 118, and therefore fastening strength and airtightness can be secured as in each embodiment mentioned above.

Figure 12:
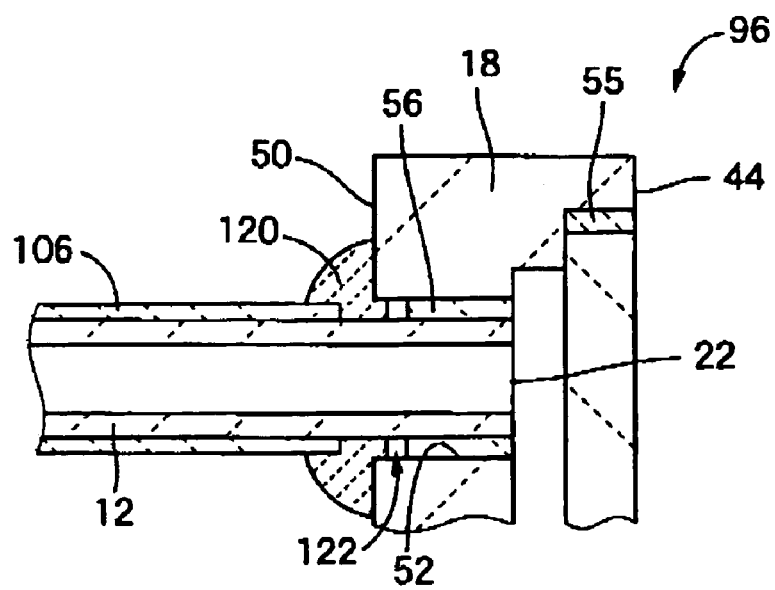
FIG. 12 is a view corresponding to FIG. 7 for explaining still another example of the junction structure of the end cap.

A junction structure shown in FIG. 12 is formed such that the seal portion 56 is retracted from the end face 50 of the end cap 18, and a seal portion 120 is fastened to the porous membrane 106, to the outer circumferential surface of the porous circular cylinder 98, and to the end cap 18. In this example, a gap 122 is created between the seal portions 56 and 120. However, the gap 122 is sealed with the porous circular cylinder 98, with the seal portion 120, and with end cap 18, and the seal portion 120 is firmly fastened to the end cap 18 and to the porous circular cylinder 98. Therefore, even in this structure, fastening strength and airtightness can be secured as in each embodiment mentioned above.

Figure 13:
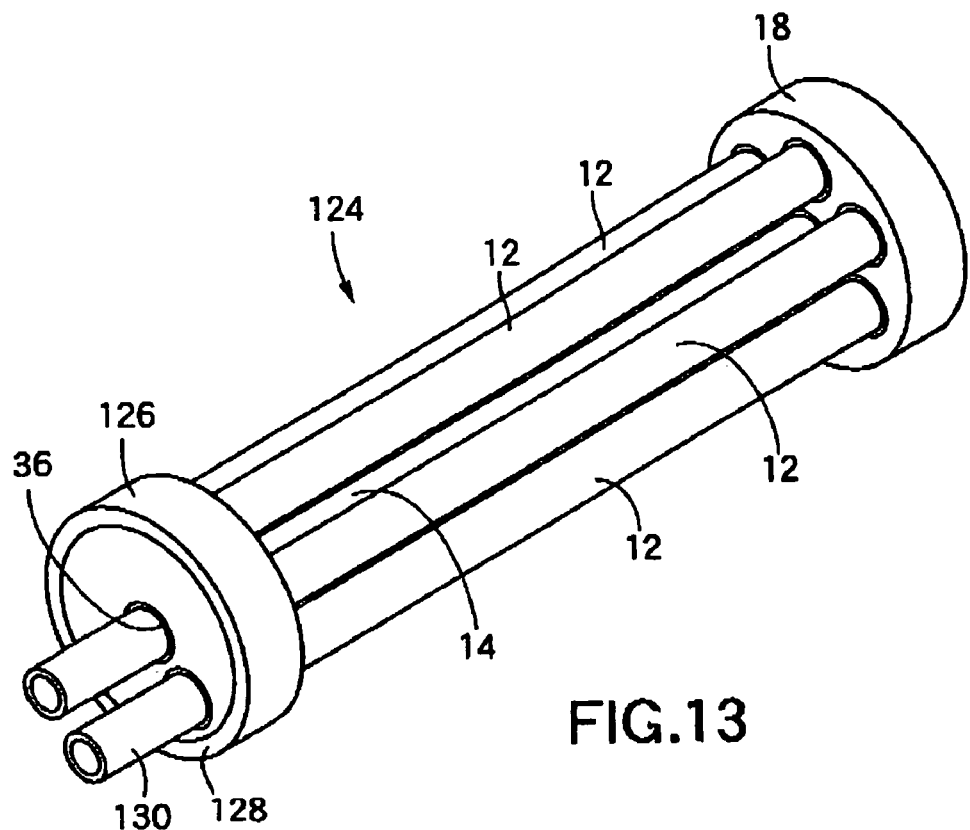
FIG. 13 is a perspective view showing the entire structure of a module 10 according to an embodiment of a fourth invention.
Figure 14:
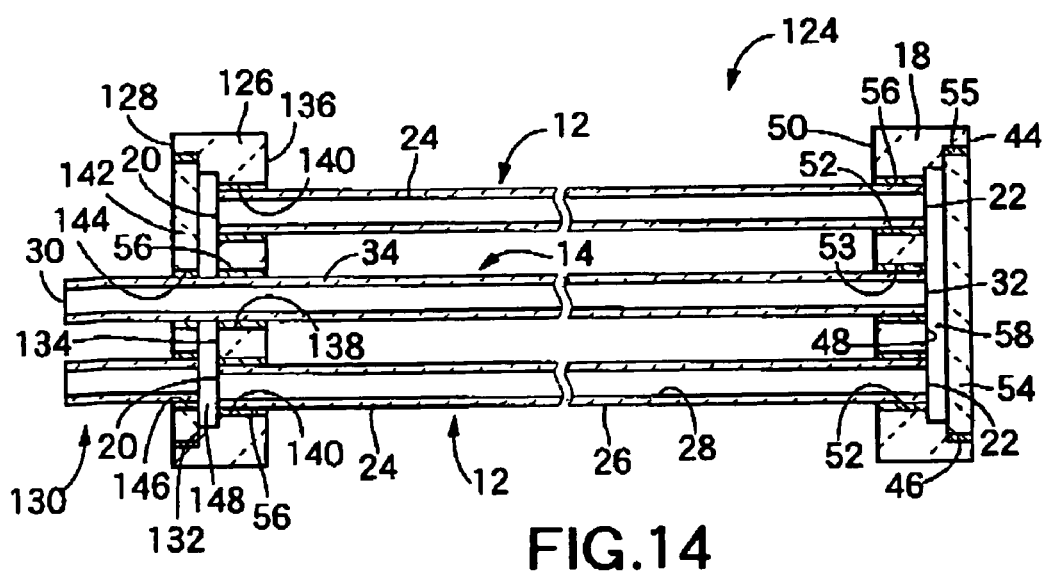
FIG. 14 is a longitudinal sectional view of the module 10 of FIG. 13.

FIG. 13 is a perspective view showing the whole of a module 124 according to an embodiment of a fourth invention, and FIG. 14 is a sectional view in the longitudinal direction of the module 124, in which an intermediate part thereof is omitted. This module 124 has the same structure as the aforementioned module 10, except that an end cap 126 instead of the end cap 16 is provided on the side of the first end 30 of the dense circular cylinder 14, and a gas supply tube 130 extending along the first end 30 is provided on the side of the other surface 128 of the end cap 126, thus forming a structure slightly different from that of the module 10. Therefore, the same reference symbols as in module 10 are given to the same or equivalent parts, and a description will be given focusing on differences therebetween.

In FIG. 13 and FIG. 14, the gas supply tube 130 is a dense circular cylinder made of the same material, such as alumina ceramics, and having the same dimensions and shape, except that the gas supply tube 130 is different in linear dimension from the dense circular cylinder 14.

The end cap 18 is formed in the same way as in module 10. On the other hand, the end cap 126 is made of dense alumina ceramics identical to those of the dense circular cylinder 14 and is shaped like a substantially circular plate as the end cap 16. The end cap 126, however, has an annular stepped portion 132 formed on one surface 128 on the opposite side of the end cap 18. The end cap 126 additionally has a concave portion 134 formed on the inner periphery thereof. The concave portion 134 has seven through-holes 138 and 140 bored through in the thickness direction from one surface 136 on the side of the end cap 18 toward the concave portion 134. Among the seven through-holes 138 and 140, one (i.e., through-hole 136) is placed at the center of the end cap 126, and the remaining six (i.e., through-holes 140) are spaced out on a circumference around the one through-hole 138 at regular intervals, i.e., at intervals of, for example, about 60 degrees. That is, the end cap 126 is structured in the same way as the end cap 18.

As in the end cap 18, a disk-shaped end cover 142 with which the concave portion 134 is closed is airtightly fastened to the other surface 128 of the end cap 126, so that gas chambers 58*a* and 58*b* are created therebetween. As in the end caps 126 and 18, the end covers 54 and 55 are made of dense alumina ceramics or the like and are impermeable to gas. However, the end cover 142 fastened to the end cap 126 has a through-hole 144 that is positioned coaxially with the through-hole 138 and that is bored through in the thickness direction at its center and a through-hole 146 bored through in the thickness direction nearer to the outer periphery than the through-hole 144.

In this embodiment, the porous circular cylinder 12 and the dense circular cylinder 14 are caused to pierce through the through-holes 138, 140, 52, and 53 of the thus structured end caps 126 and 18 and through the through-hole 144 of the end cover 142. These cylinders 12 and 14 are each tightly sealed with the seal portion 56 made of a sealing material such as seal glass. The gas supply tube 130 is caused to pierce through the through-hole 146 formed in the end cover 142, and one end thereof is opened to the gas chamber 148 whereas the other end thereof is placed outside the gas chamber 148.

As a result, as is apparent from FIG. 14, the first end 20 of the porous Circular cylinder 12 is opened to the gas chamber 148 formed between the dense end cap 126 and the end cover 142, and the second end 22 thereof is opened to the gas chamber 58 formed between the dense end cap 18 and the dense end cover 54. On the other hand, the first end 30 of the dense circular cylinder 14 is projected from the other surface 42 of the end cap 126 and is opened, and the second end 32 thereof is opened to the gas chamber 58 on the side of the end cap 18. Therefore, gas that has permeated the peripheral wall 24 of the porous circular cylinder 12 and has entered the interior of the porous circular cylinder 12 flows from the opened second end 22 toward the gas chamber 58, then flows into the dense circular cylinder 14 from the second end 32 thereof, then flows therethrough toward the first end 30 thereof, and flows out from the opened first end 30. In this embodiment, the end cap 126 serves as a supporting body, and the end cover 142 serves as a lid member, and the end cap 18 and the end cover 54 constitute a hollow sealing body. The gas chamber 58 serves as a connection path.

Gas that has been sent from the gas supply tube 130 enters the gas chamber 148 on the side of the end cap 126, then spreads therein, and enters the porous circular cylinder 12 from the first end 20 thereof. Likewise, this gas flows from the left to the right in FIG. 14 in the porous circular cylinder 12, then enters the dense circular cylinder 14 through the gas chamber 58, and is discharged from the first end 30 thereof. In this embodiment, the gas supply tube 130 serves as a sweep-gas supplying portion.

The thus structured module 124 is formed by producing the end caps 126 and 18, the end covers 54 and 142, the porous circular cylinder 12, the dense circular cylinder 14, and the gas supply tube 130, each of which has the aforementioned characteristics, according to well-known ceramic manufacturing technology and by combining and fastening these together in the same way as the module 10.

After producing each constituent part, for example, the dense circular cylinder 14 is caused to pass through the end cap 126, and the porous circular cylinder 12 is inserted thereinto, and the dense circular cylinder 14 and the porous circular cylinder 12 are fastened with the sealing material 56, and thereafter the end cap 126 is fitted to the side of the other ends of the dense circular cylinder 14 and the porous circular cylinder 12 and is fastened with the sealing material 56. The end covers 142 and 54 are then fitted to the other surface 128 of the end cap 126 and to the one surface 44 of the end cap 18 and are fastened with the sealing material 56, and thereafter the gas supply tube 130 is fitted to the end cover 142 and is fastened with the sealing material 56, thus producing the module 124. The fastening order is not limited to the aforementioned one, and is appropriately determined so as to facilitate production operations.

Figure 15:
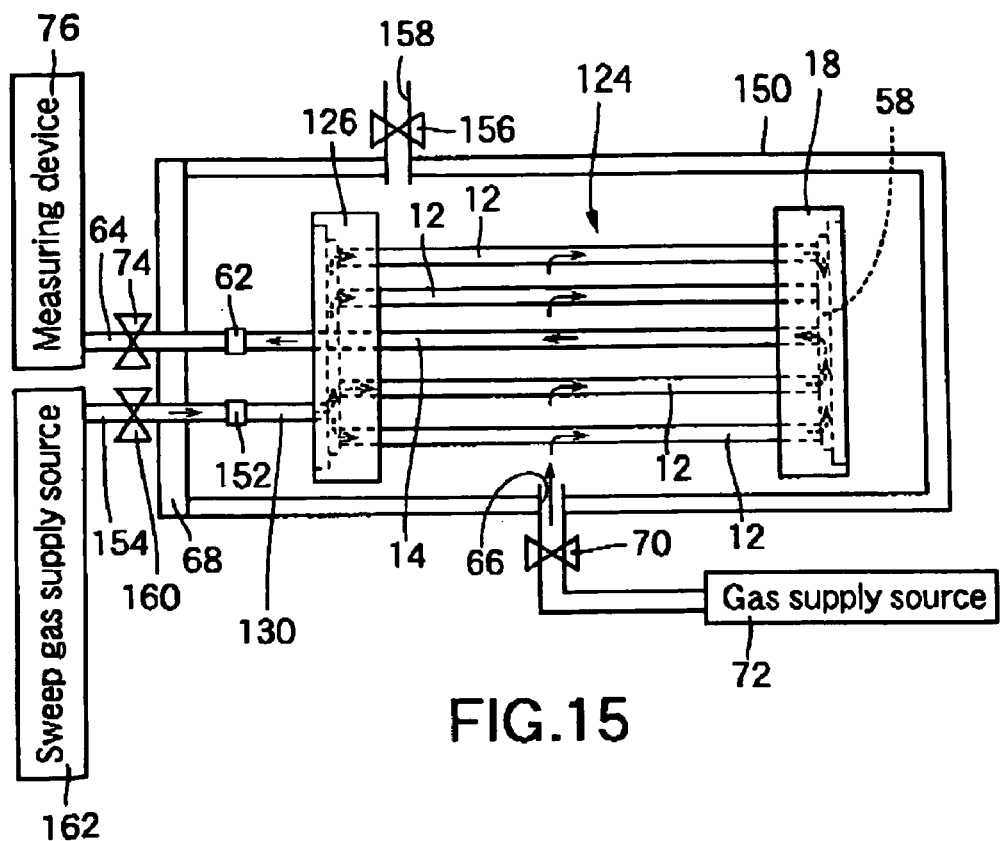
FIG. 15 is a view schematically showing a use state in which the module 10 of FIG. 13 is disposed in a reaction container 60.

FIG. 15 is a schematic view for explaining a use state of the module 124. In FIG. 15, the module 124 is fixed by a fixing device and the like, not shown, in a reaction container 150. The reaction container 150 is structured substantially in the same manner as the aforementioned reaction container 60, and a state in which the module is disposed in the reaction container 150 is substantially the same as in the reaction container 60. Therefore, a description will be given focusing on differences therebetween.

The gas supply tube 130 is airtightly connected to a sweep gas supplying path 154 by means of a joint 152, and a gas outlet 158 having a valve 156 is provided on the side face of the reaction container 150 that is situated at the upper side in the figure. A sweep-gas supply source 162 is connected to the sweep gas supplying path 154 through a valve 160. That is, also in this embodiment, the module 124 is disposed in the airtight reaction container 150, and the dense circular cylinder 14 is airtightly connected to the gas recovering path 64, and the gas supply tube 130 is airtightly connected to the sweep gas supplying path 154, but no airtight partition exists in the reaction container 150.

In this apparatus structure, when the valves 70, 74, 156, and 160 are opened to supply a predetermined gas, such as a mixed gas of nitrogen and hydrogen, from the gas supply source 72 into the reaction container 150, and when a predetermined sweep gas, such as argon, is supplied from the sweep-gas supply source 162 to the gas supply tube 130, hydrogen gas small in molecular diameter among the supplied raw gases permeates the peripheral wall of the porous circular cylinder 12, which is the only flow path, and flows into the interior of the porous circular cylinder 12, because the reaction container 150 is airtightly formed. The sweep gas flows into the interior of the porous circular cylinder 12 through the gas chamber 148 formed in the end cap 126. In FIG. 15, arrows represent the flow direction of gas. The raw gases and the sweep gas, which have flowed into the interior of the porous circular cylinder 12, flow toward the gas chamber 58, and flow into the interior of the dense circular cylinder 14 through the gas chamber 58. The gases are then guided from the dense circular cylinder 14 to the measuring device 76 through the gas recovering path 64. That is, the apparatus structure is the same as that of the reactive machine 60, except that the sweep gas is introduced.

The sweep gas that has been sent from the first end 20 of the porous circular cylinder 12 as described above cannot pass through the peripheral wall 24 of the porous circular cylinder 12 because of its large molecular diameter of argon. Therefore, the sweep gas flows directly toward the second end 22. By this flow, the inflow of the hydrogen gas permeating the peripheral wall 24 is promoted. Therefore, the yield is raised even more than a case in which the sweep gas is not introduced.

The following table 2 shows the results of permeation flow rates measured when a mixed gas of hydrogen and nitrogen is caused to flow while variously changing the constituent material of the porous circular cylinder 12 of the module 124, the supply pressure of raw gas, the presence or absence of sweep gas, etc., in this apparatus structure. The mixing ratio of the raw gas was set to be 50:50 in the molar ratio, and argon as the sweep gas was supplied under a pressure of 0.1 (MPa). Each example mentioned below was structured in the same way as the aforementioned examples, except that the pore diameter of the porous circular cylinder 12 was changed by changing the constituent material thereof. As shown below, it was ascertained that the permeation gas concentration of hydrogen gas, i.e., the yield is remarkably improved by causing the sweep gas to flow regardless of how the pore diameter or the supply gas pressure is determined. The permeation gas concentration was evaluated from the gas recovered from the gas recovering path 64 on the assumption that $H_2+N_2$ is 100 (mol %).

TABLE 2

|  | Example 6 | Example 7 | Example 8 | Example 9 |
|---|---|---|---|---|
| Constituent material of porous circular cylinder | Alumina | Alumina | Alumina + Silica | Alumina + Silica |
| Porous circular cylinder pore diameter (nm) | 4 | 4 | 0.5 | 0.5 |
| Gas supply pressure (MPa) | 0.2 | 0.3 | 0.3 | 0.5 |
| Permeation coefficient ratio ($H_2/N_2$) | 3.5 | 3.5 | 20.5 | 20.5 |
| Permeation gas concentration of $H_2$ (mol %) |  |  |  |  |
| No sweep gas | 65.1 | 69.7 | 89.3 | 92.4 |
| Presence of sweep gas | 77.2 | 76.9 | 94.5 | 94.1 |

In brief, according to this embodiment, since the module 124 in which the dense circular cylinder 14 and the plurality of porous circular cylinders 12 are bundled together has those ends connected together by means of the gas chamber 58, the module 124 can have a gas passage that goes and returns so that gas flows from the first end 20 to the second end 22 in the porous circular cylinder 12 and flows from the second end 32 to the first end 30 in the dense circular cylinder 14. Therefore, gas that has permeated the peripheral wall 24 of the porous circular cylinder 12 and that has entered the interior thereof flows through the interior and is discharged from the second end 22 to the gas chamber 58, then flows through the gas chamber 58, then flows into the dense circular cylinder 14 from the second end 32, then flows through the interior of the dense circular cylinder 14, and is recovered from the first end 30. Moreover, since the gas supply tube 130 is provided to send a sweep gas from the first end 20 of the porous circular cylinder 12, the permeability of hydrogen gas that permeates the peripheral wall 24 is raised by causing the sweep gas to flow without raising the supply pressure of a raw gas, and, consequently, the yield can be raised. At this time, since the gas supply tube 130 is disposed on the side of the first end 20 of the porous circular cylinder 12, the supply of the sweep gas and the recovering of the separated hydrogen gas are performed on the side of the same end in the longitudinal direction of the porous cylindrical body 12. Therefore, unlike a case in which these operations are respectively performed on opposite sides, an installation space of the reaction container 150 does not become large, and therefore the installation space of the reaction container 150 can be kept small while being able to supply the sweep gas.

Additionally, in this embodiment, the plurality of porous circular cylinders 12 and the dense circular cylinder 14 are bundled together at the ends 22 and 32 with the end cap 18 and with the end cover 54, and the ends 22 and 32 are opened to the gas chamber 58 created therein, and thereby the gas chamber 58 is caused to function as a connection path. Therefore, advantageously, since the connection path is formed simultaneously when the plurality of porous circular cylinders 12 and the dense circular cylinder 14 are bundled together, the structure can be made simpler, and production operations can be more easily performed than a case in which these are assigned as different members.

Still additionally, in this embodiment, advantageously, handling operations are facilitated because the plurality of porous circular cylinders 12 and the dense circular cylinder 14 are bundled together at the first ends 20 and 30 by being fastened to the end cap 126.

Next, a description will be given of another embodiment of the fourth invention. In the following embodiment, the same reference symbols as in the foregoing embodiments are given to the same or equivalent parts, and a description thereof is omitted.

Figure 16:
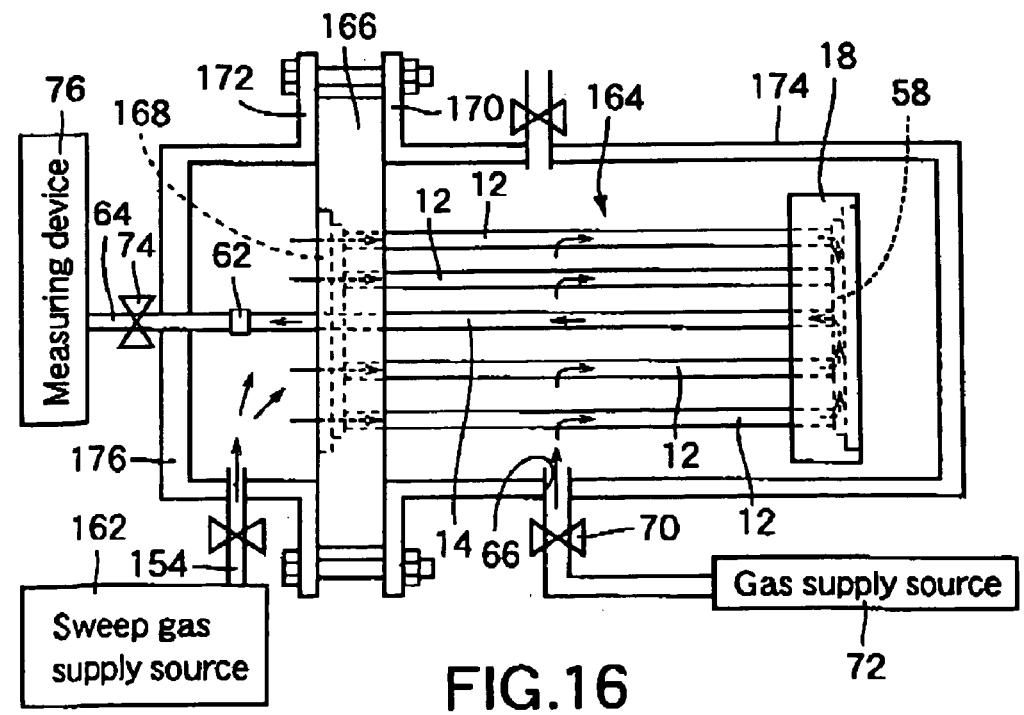
FIG. 16 is a sectional view corresponding to FIG. 15 for explaining a structure of a module 10 according to another embodiment of the fourth invention.

A module 164 shown in FIG. 16 is structured substantially in the same way as the module 124, except that there is provided an end cap 166, instead of the end cap 126, which is structured in the same way as the end cap 126 except that an outer diameter is larger than that of the end cap 126 and there is provided an end cover 168, instead of the end cover 142, which is fastened so as to close its concave part. The end cover 168 has, for example, a mean pore diameter of about 10 (μm) much larger than that of the porous cylindrical body 12 and is made of a porous material permeable to the sweep gas such as argon. The end cover 168 has only one through-hole, through which the dense circular cylinder 14 is caused to pass, at its center. The gas supply tube 130 is not attached thereto.

As shown in FIG. 16, the thus structured module 164 is housed in a reaction container 92 provided with flanges 170 and 172, and is used by airtightly sandwiching and fastening the end cover 168 between the flanges 170 and 172. In the reaction container 174, a cover 176 that creates an airtight space between the end cover 168 and the cover 176 has a sweep gas supplying path 154, and the sweep gas supplying path 154 is opened to the airtight space. The other installation structures except these are the same as in the module 124.

In the thus structured module 164, when a sweep gas is supplied from the sweep gas supplying path 154, the sweep gas permeates the porous end cap 166 and flows into the porous circular cylinder 12, and therefore the permeation of the hydrogen gas is promoted by the sweep gas, and the yield is raised as in the module 124. That is, although the module 164 does not have the self-completed gas chamber 148 as the module 124, a gas chamber is substantially formed with the cover 176, and therefore this structure is allowable. In this embodiment, a sweep-gas supplying portion is formed by the end cover 168.

In this embodiment, the end cover 168 is provided in order to prevent hydrogen gas that has permeated and entered the interior of the porous circular cylinder 12 from flowing backward from the end on the side of the end cap 166 and being discharged, and the end cover 168 can be made useless by appropriately adjusting the supply conditions of the raw gas and the sweep gas.

Figure 17:
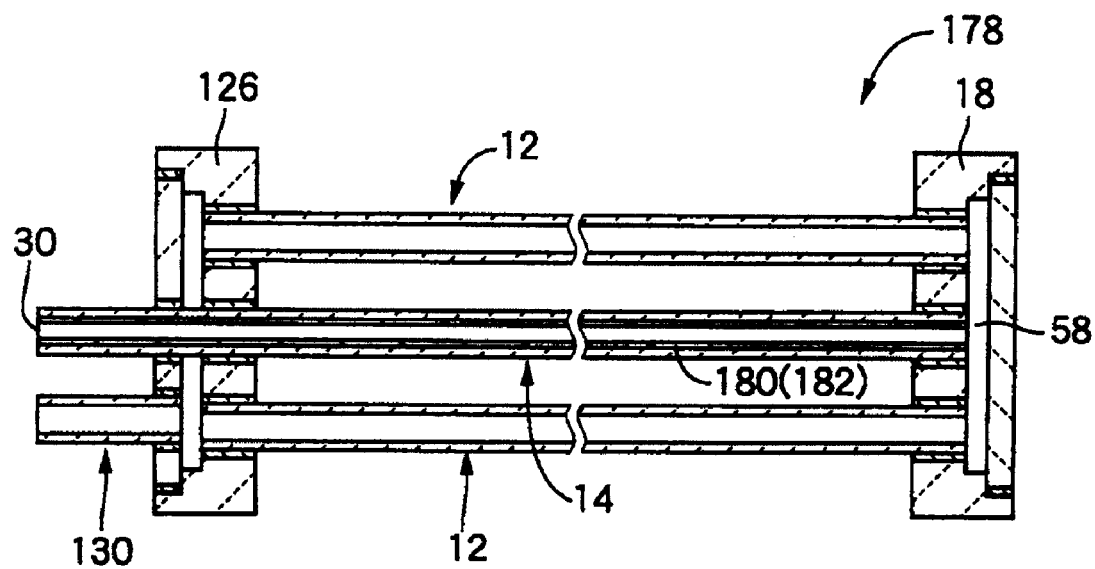
FIG. 17 is a sectional view corresponding to FIG. 14 for explaining a structure of a module 10 according to still another embodiment of the fourth invention.

Except that a catalyst layer 180 is fastened to the inner wall surface of the dense circular cylinder 14, a module 178 shown in FIG. 17 is completely the same as the module 124. The catalyst layer 180 is made of alumina that contains platinum, for example, by a ratio of about 0.1 (wt %), and has a thickness of, for example, about 100 (μm) over the whole length of the dense circular cylinder 14. In the thus structured module 178, when gas flows into the dense circular cylinder 14 through the porous circular cylinder 12 and through the gas chamber 58, the gas is caused to flow toward the open end 30 while being in contact with the catalyst layer 180 provided on the inner wall surface of the dense circular cylinder 14. Therefore, since the gas is caused to react to the catalyst during flow, a harmful gas or the like can be removed.

For example, in a case in which gas to be sent from the gas supply source 72 is a mixed gas of $H_2$, $H_2O$, and $O_2$, when the gas was caused to flow at a flow rate of about 100 (ml/min), the CO concentration in the mixed gas was 1000 (ppm) on the supply side, while the CO concentration was lowered to about 8 (ppm) on the outlet side. When the gas was caused to flow at a flow rate of about 1000 (ml/min) under the same condition of the CO concentration on the supply side, the CO concentration on the outlet side was able to be lowered to about 50 (ppm). In a case in which the mixed gas to be introduced is a mixed gas of air and hydrogen, when the VOC concentration on the supply side was about 10000 (ppm) at a flow rate of about 1000 (ml/min), the VOC concentration was able to be lowered to about 500 (ppm) on the outlet side.

Another catalyst layer instead of the catalyst layer 180 can be provided to remove a slight quantity of impurities in gas. Alternatively, an adsorption layer 182 can be provided instead of the catalyst layer 180. For example, if the adsorption layer 182 that contains magnesium and a lithium compound is provided, $CO_2$ in gas can be removed. If the adsorption layer 182 is formed of silica gel or a molecular sieve, a slight quantity of water contained in gas can be removed.

Although the embodiments of the present invention have been described as above with reference to the attached drawings, these are first and foremost the ones of the present invention, and the present invention can be embodied in other various forms without departing from the spirit thereof.

The invention claimed is:

1. A porous cylindrical-body module comprising:
a plurality of porous cylindrical bodies that are bundled together apart from each other disposed with a predetermined gap therebetween, each of which has a porous cylindrical circumferential wall that is permeable to a predetermined gas containing gas molecules of different diameters, and one end of each of which is substantially closed;
a hollow sealing body that includes a gas chamber enclosed by a dense wall that is impermeable to the predetermined gas and gas passages communicating an interior of the gas chamber with an exterior thereof, and in which the gas chamber being communicated with the exterior through the porous cylindrical bodies by airtightly fastening the other end of each of the porous cylindrical bodies to the gas chamber with fitting the other end thereof to the gas passages to be opened to the interior of the gas chamber; and
a dense cylindrical body, which has a dense circumferential wall impermeable to the predetermined gas, and one end of which is opened to the interior of the gas chamber whereas the other end of which is opened to an exterior of the hollow sealing body by being airtightly fastened to the gas passage,
wherein the dense cylindrical body includes a functional layer that is fastened to an inner wall surface thereof and that has a predetermined function, and wherein the porous cylindrical bodies and the hollow sealing body are made of ceramics.

2. The porous cylindrical-body module according to claim 1, further comprising a closing-and-sealing body that is formed of a dense material impermeable to the predetermined gas and that is airtightly fastened to the one end of the plurality of porous cylindrical bodies in a state closed at one end.

3. A porous cylindrical-body supporting structure in which a predetermined supporting member for annularly covering an outer peripheral surface of a porous cylindrical body is fastened to a part in a longitudinal direction of the porous cylindrical body having many gas-permeable pores which communicate with an exterior of a circumferential wall with an interior thereof and though which a predetermined gas containing gas molecules of different diameters permeates, comprising:
(a) a first seal portion made of a first sealing material for fastening the porous cylindrical body and the supporting member together so as to tightly seal a gap therebetween;
(b) a porous membrane that is provided to annularly cover the outer peripheral surface of the porous cylindrical body to communicate the gas-permeable pore to the exterior; and
(c) a second seal portion made of a second sealing material that is annularly provided at a boundary between the porous membrane and the first seal portion so as to close the outer peripheral surface of the porous cylindrical body and that has a softening point lower than a temperature at which the porous membrane is formed.

4. The porous cylindrical-body supporting structure according to claim 3, wherein the porous membrane and the first seal portion are kept apart from each other by a predetermined distance in the longitudinal direction of the porous cylindrical body.

5. The porous cylindrical-body supporting structure according to claim 3, wherein the porous membrane is brought into contact with the first seal portion.

6. The porous cylindrical-body supporting structure according to claim 3, wherein the porous membrane is slightly overlapped with the first seal portion.

7. The porous cylindrical-body supporting structure according to claim 3, wherein an end of the first seal portion on the side of the porous membrane is projected from the supporting member, and the second seal portion is fastened to the first seal portion and to the supporting member.

8. The porous cylindrical-body supporting structure according to claim 3, wherein the supporting member supports a plurality of the porous cylindrical bodies.

9. The porous cylindrical-body supporting structure according to claim 3, wherein the supporting member is fastened to an open end of the porous cylindrical body, and the open end is opened to an interior of an airtight chamber wherein an outer wall of which is formed by at least a part of the supporting member.

10. The porous cylindrical-body supporting structure according to claim 3, wherein the porous cylindrical body, the supporting member, the first seal portion, the second seal portion and the porous membrane are made of ceramics.

11. A method for fastening a supporting member, annularly covering an outer peripheral surface of a porous cylindrical body, to a part in a longitudinal direction of the porous cylindrical body having many gas-permeable pores which an exterior of a circumferential wall of the porous cylindrical body to an interior thereof, and through which a predetermined gas containing gas molecules of different diameters permeates, comprising:
(a) a first sealing step to fasten the supporting member to the outer peripheral surface of the porous cylindrical body with a first sealing material and thereby tightly sealing a gap therebetween with a first seal portion made of the first sealing material;
(b) a membrane forming step to cover the outer peripheral surface of the porous cylindrical body, to which the supporting member is fastened, with a porous membrane communicating the gas-permeable pore with the exterior; and
(c) a second sealing step to seal a boundary between the porous membrane and the first seal portion with a second sealing material having a softening point lower than a temperature at which the porous membrane is formed, thereby closing the outer peripheral surface of the porous cylindrical body with an annular second seal portion made of the second sealing material.

12. The method for fastening a supporting member according to claim 11, wherein the porous membrane and the first seal portion are kept apart from each other by a predetermined distance in the longitudinal direction of the porous cylindrical body.

13. The porous cylindrical-body supporting structure according to claim 11, wherein the porous membrane is brought into contact with the first seal portion.

14. The porous cylindrical-body supporting structure according to claim 11, wherein the porous membrane is slightly overlapped with the first seal portion.

15. A porous cylindrical-body module, comprising:
(a) a plurality of porous cylindrical bodies each of which has a porous cylindrical circumferential wall permeable to a predetermined gas containing gas molecules of different diameters, both ends of each of which are opened, and which are bundled together so as to be kept apart from each other with a predetermined distance;

(b) a dense cylindrical body which has a dense cylindrical circumferential wall impermeable to the predetermined gas, both ends of which are opened, and which is bundled together with the plurality of porous cylindrical bodies so as to be kept apart from the plurality of porous cylindrical bodies with a predetermined distance;

(c) a connection path to guide gas that is discharged from ends of the plurality of porous cylindrical bodies, all of which are located on the same side in the longitudinal direction of the porous cylindrical body, into the interior of the dense cylindrical body from an end thereof, which is located on the same side as the ends of the plurality of porous cylindrical bodies;

(d) a sweep-gas supplying portion which is provided at the other end of each of the plurality of porous cylindrical bodies to supply a sweep gas from the other end of each of the plurality of porous cylindrical bodies; and (e) a lid member made of a dense material impermeable to the predetermined gas, wherein the lid member is airtightly fastened to a supporting body so as to form a gas chamber between a surface of the supporting body and the lid member and having a through-hole that functions as the sweep-gas supplying portion by communicating the gas chamber to an exterior of the gas chamber, and wherein the other end of each of the plurality of porous cylindrical bodies is opened to the interior of the gas chamber, and the other end of the dense cylindrical body is caused to pass through the lid member and is opened outside the gas chamber.

16. The porous cylindrical-body module according to claim 15, further comprising:

a second gas chamber enclosed by a dense wall impermeable to the predetermined gas and a hollow sealing body that is airtightly fastened to the plurality of porous cylindrical bodies and to the dense cylindrical body so that the end of each of the plurality of porous cylindrical bodies and the end of the dense cylindrical body are opened to the second gas chamber, and the connection path is formed by the gas second chamber.

17. The porous cylindrical-body module according to claim 15, wherein the supporting body is made of a dense material impermeable to the predetermined gas and is airtightly fastened to the other end of each of the plurality of porous cylindrical bodies and the other end of the dense cylindrical body to allow passage through the supporting body from one surface of the supporting body to an other surface thereof, and the sweep-gas supplying portion is provided on the other surface of the supporting body.

18. The porous cylindrical-body module according to claim 15, wherein the porous cylindrical body, the dense cylindrical body, the sweep-gas supplying portion and a hollow sealing body are made of ceramics.

19. The porous cylindrical-body module according to claim 15, further comprising:

a functional layer that is fastened to an inner surface of the circumferential wall of the dense cylindrical body and that has a predetermined function.

20. A porous cylindrical-body module, comprising:

(a) a plurality of porous cylindrical bodies each of which has a porous cylindrical circumferential wall permeable to a predetermined gas, both ends of each of which are opened, and which are bundled together so as to be kept apart from each other with a predetermined distance;

(b) a dense cylindrical body which has a dense cylindrical circumferential wall impermeable to the predetermined gas, both ends of which are opened, and which is bundled together with the plurality of porous cylindrical bodies so as to be kept apart from the plurality of porous cylindrical bodies with a predetermined distance;

(c) a connection path to guide the gas that is discharged from ends of the plurality of porous cylindrical bodies, all of which are located on the same side in the longitudinal direction of the porous cylindrical body, into the interior of the dense cylindrical body from an end thereof which is located on the same side as the ends of the plurality of porous cylindrical bodies;

(d) a sweep-gas supplying portion which is provided at the other end of each of the plurality of porous cylindrical bodies to supply a sweep gas from the other end of each of the plurality of porous cylindrical bodies; and (e) a lid member made of a porous material permeable to the sweep gas, which is fastened to a surface of a supporting body while closing an opening of the other end of each of the plurality of porous cylindrical bodies, and through which the other end of the dense cylindrical body is caused to pass.

21. The porous cylindrical-body module according to claim 20, further comprising:

a gas chamber enclosed by a dense wall impermeable to the predetermined gas; and a hollow sealing body that is airtightly fastened to the plurality of porous cylindrical bodies and to the dense cylindrical body so that the end of each of the plurality of porous cylindrical bodies and the end of the dense cylindrical body are opened to the gas chamber, and the connection path is formed by the gas chamber.

22. The porous cylindrical-body module according to claim 20, wherein the supporting body is made of a dense material impermeable to the predetermined gas and is airtightly fastened to the other end of each of the plurality of porous cylindrical bodies and the other end of the dense cylindrical body to allow passage through the supporting body from one surface of the supporting body to an other surface thereof, and the sweep-gas supplying portion is provided on the other surface of the supporting body.

23. The porous cylindrical-body module according to claim 20, wherein the porous cylindrical body, the dense cylindrical body, the sweep-gas supplying portion and a hollow sealing body are made of ceramics.

24. The porous cylindrical-body module according to claim 20, further comprising:

a functional layer that is fastened to an inner surface of the dense cylindrical circumferential wall of the dense cylindrical body and that has a predetermined function.

* * * * *